(12) United States Patent
Maehara et al.

(10) Patent No.: US 7,587,249 B2
(45) Date of Patent: Sep. 8, 2009

(54) ELECTRONIC APPLIANCE

(75) Inventors: Atsushi Maehara, Osaka (JP); Toru Ueda, Kyoto (JP); Kazuya Oyama, Ikoma (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 982 days.

(21) Appl. No.: 11/029,701

(22) Filed: Jan. 6, 2005

(65) Prior Publication Data
US 2005/0147129 A1 Jul. 7, 2005

(30) Foreign Application Priority Data
Jan. 7, 2004 (JP) .............................. 2004-002316

(51) Int. Cl.
*G05B 15/00* (2006.01)
*G05B 11/01* (2006.01)

(52) U.S. Cl. ................................ 700/1; 700/17; 700/83

(58) Field of Classification Search .................... 700/1, 700/17, 83
See application file for complete search history.

(56) References Cited

U.S. PATENT DOCUMENTS

| | | | | |
|---|---|---|---|---|
| 5,235,414 A | * | 8/1993 | Cohen | ........................ 725/13 |
| 5,715,020 A | * | 2/1998 | Kuroiwa et al. | ............. 348/734 |
| 5,828,945 A | | 10/1998 | Klosterman | |
| 6,469,751 B1 | * | 10/2002 | Isobe et al. | ................. 348/734 |
| 7,170,422 B2 | * | 1/2007 | Nelson et al. | .......... 340/825.72 |
| 7,375,673 B2 | * | 5/2008 | Spilo | ......................... 341/176 |
| 2002/0059617 A1 | | 5/2002 | Terakado et al. | |
| 2005/0054450 A1 | * | 3/2005 | Yamaguchi | .................. 463/58 |

FOREIGN PATENT DOCUMENTS

| | | |
|---|---|---|
| JP | 7-99689 A | 4/1995 |
| JP | 9-120666 A | 5/1997 |
| JP | 10-116058 A | 5/1998 |
| JP | 10-155188 A | 6/1998 |
| JP | 11-308538 A | 11/1999 |

* cited by examiner

*Primary Examiner*—Ronald D Hartman, Jr.
(74) *Attorney, Agent, or Firm*—Birch, Stewart, Kolasch and Birch, LLP

(57) ABSTRACT

An electric appliance 1 has a code correspondence data table that accommodates the correspondence among the control signals of the remote control units belonging to recording medium drive apparatuses 2-1 to 2-$m$ and signal reception apparatuses 3-1 to 3-$n$ and a code correspondence data table that accommodates the correspondence between those control signals and the various operations performed by the electric appliance 1 to select contents. With reference to these code correspondence data tables, contents are selected and reproduced according to control signals transmitted from any remote control unit 6.

10 Claims, 19 Drawing Sheets

FIG.3

| PORT | MANUFACTURER | MODEL | MODEL-SPECIFIC INFORMATION |
|---|---|---|---|
| 1 | A | VTR a | code 1 |
| 2 | C | DVD d | code 4 |
| 3 | A | VTR c | code 3 |
| 4 | C | DVD d | code 4 |
| 5 | F | CD g | code 7 |
| 6 | F | MD h | code 8 |
| 7 | A | HDD i | code 9 |
| 8 | – | – | – |
| 9 | – | – | – |
| 10 | – | – | – |
| 11 | B | TERRESTRIAL TV TUNER b | code 2 |
| 12 | D | DIGITAL TV TUNER e | code 5 |
| 13 | B | SATELLITE TV TUNER j | code 10 |
| 14 | E | DIGITAL TV TUNER f | code 6 |
| 15 | – | – | – |
| 16 | – | – | – |
| 17 | – | – | – |
| 18 | – | – | – |
| 19 | – | – | – |
| 20 | – | – | – |

FIG.4

| MODEL | FUNCTION | REMOTE CONTROL CODES | | | | | | | | | |
|---|---|---|---|---|---|---|---|---|---|---|---|
| | | a | b | c | d | e | f | g | h | i | j |
| a | PLAY | PLAY | 5 | PLAY | PLAY | 5 | 5 | PLAY | PLAY | PLAY | 5 |
| | STOP | STOP | 11 | STOP | STOP | 0 | 0 | STOP | STOP | STOP | 0 |
| | FAST FORWARD | FAST FORWARD | 6 | FAST FORWARD | FAST FORWARD | 6 | 6 | NEXT | FAST FORWARD | FAST FORWARD | 6 |
| | REWIND | REWIND | 4 | REWIND | REWIND | 4 | 4 | PREVIOUS | REWIND | REWIND | 4 |
| | RECORD VIDEO | RECORD VIDEO | 2 | RECORD VIDEO | ENTER | 2 | 2 | VOLUM UP | RECORD AUDIO | RECORD | 2 |
| b | TUNE UP | FAST FORWARD | TUNE UP | TUNE UP | RIGHT | TUNE UP | TUNE UP | NEXT | FAST FORWARD | RIGHT | TUNE UP |
| | TUNE DOWN | REWIND | TUNE DOWN | TUNE DOWN | LEFT | TUNE DOWN | TUNE DOWN | PREVIOUS | REWIND | LEFT | TUNE DOWN |
| | CH. CODE | – | CH. CODE | NO. CODE | – | NO. CODE | NO. CODE | – | – | – | NO. CODE |
| c | PLAY | PLAY | 5 | PLAY | PLAY | 5 | 5 | PLAY | PLAY | PLAY | 5 |
| | STOP | STOP | 11 | STOP | STOP | 0 | 0 | STOP | STOP | STOP | 0 |
| | FAST FORWARD | FAST FORWARD | 6 | FAST FORWARD | FAST FORWARD | 6 | 6 | NEXT | FAST FORWARD | FAST FORWARD | 6 |
| | REWIND | REWIND | 4 | REWIND | REWIND | 4 | 4 | PREVIOUS | REWIND | REWIND | 4 |
| | RECORD VIDEO | RECORD VIDEO | 2 | RECORD VIDEO | ENTER | 2 | 2 | VOLUM UP | RECORD AUDIO | REDORD | 2 |
| | TUNE UP | TUNE UP | TUNE UP | TUNE UP | RIGHT | TUNE UP | TUNE UP | – | NEXT | RIGHT | TUNE UP |
| | TUNE DOWN | TUNE DOWN | TUNE DOWN | TUNE DOWN | LEFT | TUNE DOWN | TUNE DOWN | – | PREVIOUS | LEFT | TUNE DOWN |
| | NO. CODE | – | CH. CODE | NO. CODE | – | NO. CODE | NO. CODE | – | – | – | NO. CODE |
| d | PLAY | PLAY | 5 | PLAY | PLAY | 5 | 5 | PLAY | PLAY | PLAY | 5 |
| | STOP | STOP | 11 | STOP | STOP | 0 | 0 | STOP | STOP | STOP | 0 |
| | FAST FORWARD | FAST FORWARD | 6 | FAST FORWARD | FAST FORWARD | 6 | 6 | NEXT | FAST FORWARD | FAST FORWARD | 6 |
| | REWIND | REWIND | 4 | REWIND | REWIND | 4 | 4 | PREVIOUS | REWIND | REWIND | 4 |
| e | TUNE UP | FAST FORWARD | TUNE UP | TUNE UP | RIGHT | TUNE UP | TUNE UP | NEXT | FAST FORWARD | RIGHT | TUNE UP |
| | TUNE DOWN | REWIND | TUNE DOWN | TUNE DOWN | LEFT | TUNE DOWN | TUNE DOWN | PREVIOUS | REWIND | LEFT | TUNE DOWN |
| | NO. CODE | – | CH. CODE | NO. CODE | – | NO. CODE | NO. CODE | – | – | – | NO. CODE |
| f | TUNE UP | FAST FORWARD | TUNE UP | TUNE UP | RIGHT | TUNE UP | TUNE UP | NEXT | FAST FORWARD | RIGHT | TUNE UP |
| | TUNE DOWN | REWIND | TUNE DOWN | TUNE DOWN | LEFT | TUNE DOWN | TUNE DOWN | PREVIOUS | REWIND | LEFT | TUNE DOWN |
| | NO. CODE | – | CH. CODE | NO. CODE | – | NO. CODE | NO. CODE | – | – | – | NO. CODE |
| g | PLAY | PLAY | 5 | PLAY | PLAY | 5 | 5 | PLAY | PLAY | PLAY | 5 |
| | STOP | STOP | 11 | STOP | STOP | 0 | 0 | STOP | STOP | STOP | 0 |
| | NEXT | FAST FORWARD | 6 | FAST FORWARD | FAST FORWARD | 6 | 6 | NEXT | FAST FORWARD | FAST FORWARD | 6 |
| | PREVIOUS | REWIND | 4 | REWIND | REWIND | 4 | 4 | PREVIOUS | REWIND | REWIND | 4 |
| h | PLAY | PLAY | 5 | PLAY | PLAY | 5 | 5 | PLAY | PLAY | PLAY | 5 |
| | STOP | STOP | 11 | STOP | STOP | 0 | 0 | STOP | STOP | STOP | 0 |
| | FAST FORWARD | FAST FORWARD | 6 | FAST FORWARD | FAST FORWARD | 6 | 6 | – | FAST FORWARD | FAST FORWARD | 6 |
| | REWIND | REWIND | 4 | REWIND | REWIND | 4 | 4 | – | REWIND | REWIND | 4 |
| | NEXT | TUNE UP | 9 | 6 | RIGHT | 9 | 9 | NEXT | NEXT | RIGHT | 9 |
| | PREVIOUS | TUNE DOWN | 7 | 4 | LEFT | 7 | 7 | PREVIOUS | PREVIOUS | LEFT | 7 |
| | RECORD AUDIO | RECORD VIDEO | 2 | RECORD VIDEO | ENTER | 2 | 2 | VOLUM UP | RECORD AUDIO | RECORD | 2 |
| i | PLAY | PLAY | 2 | PLAY | PLAY | 5 | 5 | PLAY | PLAY | PLAY | 5 |
| | STOP | STOP | 4 | STOP | STOP | 0 | 0 | STOP | STOP | STOP | 0 |
| | FAST FORWARD | FAST FORWARD | 3 | FAST FORWARD | FAST FORWARD | 9 | 6 | NEXT | FAST FORWARD | FAST FORWARD | 6 |
| | REWIND | REWIND | 1 | REWIND | REWIND | 7 | 4 | PREVIOUS | REWIND | REWIND | 4 |
| | RECORD VIDEO | RECORD VIDEO | 6 | RECORD VIDEO | ENTER | 1 | 1 | VOLUM UP | RECORD AUDIO | RECORD | 1 |
| | UP | – | 2 | 8 | UP | 8 | 8 | – | – | UP | 8 |
| | DOWN | – | 8 | 2 | DOWN | 2 | 2 | – | – | DOWN | 2 |
| | RIGHT | – | 6 | 6 | RIGHT | 6 | 6 | – | – | RIGHT | 6 |
| | LEFT | – | 4 | 4 | LEFT | 4 | 4 | – | – | LEFT | 4 |
| j | TUNE UP | FAST FORWARD | TUNE UP | TUNE UP | RIGHT | TUNE UP | TUNE UP | NEXT | FAST FORWARD | RIGHT | TUNE UP |
| | TUNE DOWN | REWIND | TUNE DOWN | TUNE DOWN | LEFT | TUNE DOWN | TUNE DOWN | PREVIOUS | REWIND | LEFT | TUNE DOWN |
| | NO. CODE | – | CH. CODE | NO. CODE | – | NO. CODE | NO. CODE | – | – | – | NO. CODE |

FIG.5

| CONTROL CODE | REMOTE CONTROL CODE | | | | | | | | | |
|---|---|---|---|---|---|---|---|---|---|---|
| | a | b | c | d | e | f | g | h | i | j |
| ENTER | PLAY | 5 | PLAY | ENTER | 5 | 5 | PLAY | PLAY | ENTER | 5 |
| CANCEL | STOP | 11 | STOP | CANCEL | 0 | 0 | STOP | STOP | CANCEL | 0 |
| UP | TUNE UP | 2 | 8 | UP | 8 | 8 | VOLUM UP | NEXT | UP | 8 |
| DOWN | TUNE DOWN | 8 | 2 | DOWN | 2 | 2 | VOLUM DOWN | PREVIOUS | DOWN | 2 |
| RIGHT | FAST FORWARD | 6 | 6 | RIGHT | 6 | 6 | NEXT | FAST FORWARD | RIGHT | 6 |
| LEFT | REWIND | 4 | 4 | LEFT | 4 | 4 | PREVIOUS | REWIND | LEFT | 4 |

FIG.6

| MODEL | PORT | CONTENTS | SUBDATA |
|---|---|---|---|
| VTR a | 1 | MOVIE y | DURATION : 02:06:00 |
| DVD d | 2 | MOVIE x | DURATION : 02:12:00<br>CHAPTER cx1~cx20 |
| VTR c | 3 | PROGRAM t<br>START TIME<br>2001/04/20 19:00:00 | DURATION : 01:00:00 |
| | | CHANNEL ch1<br>START TIME<br>2001/10/05 09:30:02 | DURATION : 00:28:03 |
| | | CHANNEL ch3<br>START TIME<br>2002/08/25 21:02:31 | DURATION : 02:15:45 |
| DVD d | 4 | MOVIE r | DURATION : 01:58:00<br>CHAPTER cy1~cy15 |
| CD g | 5 | SONG 1 | DURATION : 00:05:38 |
| | | SONG 2 | DURATION : 00:04:02 |
| | | SONG 3 | DURATION : 00:04:20 |
| | | SONG 4 | DURATION : 00:03:42 |
| | | SONG 5 | DURATION : 00:04:11 |
| | | SONG 6 | DURATION : 00:03:33 |
| | | SONG 7 | DURATION : 00:03:19 |
| | | SONG 8 | DURATION : 00:04:45 |
| MD h | 6 | SONG 1a | DURATION : 00:04:12 |
| | | SONG 2a | DURATION : 00:03:09 |
| | | SONG 3a | DURATION : 00:05:11 |
| | | SONG 4a | DURATION : 00:05:02 |
| | | SONG 5a | DURATION : 00:04:58 |
| | | SONG 6a | DURATION : 00:03:51 |
| HDD i | 7 | PROGRAM v<br>START TIME<br>2003/05/15 20:00:00 | DURATION : 01:00:00 |
| | | CHANNEL ch2<br>START TIME<br>2003/06/21 11:31:12 | DURATION : 00:28:15 |
| | | MOVIE w | DURATION : 02:02:54 |
| | | MOVIE z | DURATION : 02:05:38 |
| | | SONG 1b | DURATION : 00:05:38 |
| | | SONG 2b | DURATION : 00:04:02 |
| | | SONG 3b | DURATION : 00:03:34 |
| | | SONG 4b | DURATION : 00:03:19 |
| | | SONG 5b | DURATION : 00:04:28 |

FIG.16

| FUNCTION | REMOTE CONTROL CODES | | | | | | | | | |
|---|---|---|---|---|---|---|---|---|---|---|
| | a | b | c | d | e | f | g | h | i | j |
| PLAY | PLAY | 5 | PLAY | PLAY | 5 | 5 | PLAY | PLAY | PLAY | 5 |
| STOP | STOP | 11 | STOP | STOP | 0 | 0 | STOP | STOP | STOP | 0 |
| FAST FORWARD | FAST FORWARD | 6 | FAST FORWARD | FAST FORWARD | 6 | 6 | NEXT | FAST FORWARD | FAST FORWARD | 6 |
| REWIND | REWIND | 4 | REWIND | REWIND | 4 | 4 | PREVIOUS | REWIND | REWIND | 4 |
| SELECT CONTENTS | RECORD VIDEO | 2 | RECORD VIDEO | CANCEL | 2 | 2 | VOLUM UP | PREVIOUS | CANCEL | 2 |

ELECTRONIC APPLIANCE

This nonprovisional application claims priority under 35 U.S.C. § 119(a) on Patent Application No. 2004-002316 filed in Japan on Jan. 7, 2004, the entire contents of which are hereby incorporated by reference.

BACKGROUND OF THE INVENTION

1. Field of the Invention

The present invention relates to an electronic appliance that is connected to a plurality of external appliances. More particularly, the present invention relates to an electronic appliance that is connected to a contents providing apparatus that provides contents.

2. Description of Related Art

Today, various kinds of recording medium are available, for example audio tapes, video tapes, CDs (compact discs), DVDs (digital versatile disks), MDs (minidisks), and hard disks, and these recording media are used to store audio and video contents. On the other hand, contents are provided for a general audience via various kinds of communication medium, for example terrestrial television and radio broadcasting, satellite broadcasting, cable television broadcasting, digital television broadcasting, and the Internet.

To cope with this, various kinds of contents providing apparatus are available, for example recording medium playback apparatuses for playing back various kinds of recording medium having contents as mentioned above recorded thereon, tuner apparatuses for receiving various broadcast signals, and network apparatuses connected to the Internet, and these apparatuses are connected to reproduction/output apparatuses provided with displays and speakers for reproducing and outputting audio and video. These contents providing apparatuses and reproduction/output apparatuses are typically accompanied with their respective remote control units for feeding them with operation commands.

Thus, when a contents providing apparatus and a reproduction/output apparatus, each accompanied with a remote control unit, are connected together, operating those apparatuses requires the user to communicate with them by using one remote control unit sometimes and the other remote control unit other times. If the contents providing apparatus and the reproduction/output apparatus are installed in remote places, for example in different rooms, the user monitoring by the side of the reproduction/output apparatus needs to move over to the place where the contents providing apparatus is installed to operate it. This is troublesome.

As a solution to this inconvenience, there has conventionally been proposed a centralized control system for controlling electronic appliances (see Japanese Patent Application Laid-Open No. H10-116058). In this system, control signals are transmitted to, among a plurality of electronic appliances connected together, only a particular electronic appliance from the remote control unit dedicated thereto, and doing so permits all the other connected electronic appliances to be operated. For example, assume that the particular electronic appliance is an AV amplifier, and a CD changer is connected as an electronic appliance to the AV amplifier. In this case, both the CD changer and the AV amplifier can be operated by the use of the remote control unit designed for and dedicated to the AV amplifier. Specifically, to operate the CD changer, an operation command therefor is transmitted to the AV amplifier from the remote control unit dedicated thereto. The AV amplifier then converts the received operation command into a control signal for operating the CD changer, and then transmits it to the CD changer, with the result that the operation of the CD changer is controlled in the desired manner.

There has also been proposed an electronic appliance that can readily recognize the kind of an external appliance connected thereto (see Japanese Patent Application Laid-Open No. H11-308538). This electronic appliance recognizes the kind of the external appliance by judging the signal corresponding to a particular operation that is transmitted from the remote control unit dedicated to that external appliance. Once the electronic appliance recognizes the kind of an external appliance in this way, when the electronic appliance thereafter receives a signal from the remote control unit dedicated to the external appliance, the electronic appliance recognizes it as a control signal for the external appliance, and then transmits the recognized control signal to the external appliance, with the result that the operation of the external appliance is controlled in the desired manner.

The centralized control system proposed in Japanese Patent Application Laid-Open No. H10-116058 mentioned above, however, has the following disadvantages. First, it cannot control the operation of the electronic appliances connected together by the use of any remote control unit other than that dedicated to a particular electronic appliance. For example, in a case where a contents providing apparatus is connected to a reproduction/output apparatus, the operation of the contents providing apparatus can only be controlled via the reproduction/output apparatus by the use of the remote control unit dedicated thereto. Thus, if this dedicated remote control unit becomes missing, it becomes impossible to perform remote control via the reproduction/output apparatus. Second, in a case where a plurality of electronic appliances of the same kind are connected together, an identical control signal is transmitted for a particular operation of any one of those electronic appliances. This makes it impossible to judge which electronic appliance to actually operate. For example, in a case where a plurality of contents providing apparatuses of the same kind are connected to a reproduction/output apparatus, an identical control signal is likely to be recognized by every one of those contents providing apparatuses of the same kind as one addressed thereto, with the result that all the contents providing apparatuses start to perform the operation specified by the control signal.

On the other hand, the electronic appliance proposed in Japanese Patent Application Laid-Open No. H11-308538 mentioned above has the following disadvantages. First, when a control signal is transmitted from a remote control unit, only such external appliances as are designed to work with this remote control unit can be operated; that is, no external appliances that are not designed to work with that remote control unit can be controlled. Second, in a case where a plurality of external appliances are connected together, selection among them is achieved by judging the remote control unit that is communicating with the electronic appliance. Thus, every time the electronic appliance to be operated is switched from one to another, the remote control unit used for that purpose needs to be switched from one to another. Third, which external appliance to actually operate is judged according to the kind of the remote control unit being used. Thus, in a case where a plurality of external appliances of the same kind are connected together, when the remote control unit of any one of those external appliances is used, a control signal transmitted therefrom is likely to be recognized by every one of those external appliances as one addressed thereto, with the result that all the external appliances start to perform the operation specified by the control signal.

SUMMARY OF THE INVENTION

In view of the conventionally experienced inconveniences discussed above, it is an object of the present invention to provide an electronic appliance that can control operations for selecting or reproducing contents according to control signals transmitted from a remote control unit irrespective of the kind of a contents providing apparatus used as an external appliance with which the remote control unit is designed to work.

To achieve the above object, according to one aspect of the present invention, an electronic appliance is provided with: a signal transmitter/receiver for receiving signals from a plurality of contents providing apparatuses that each provide contents and transmitting to the contents providing apparatuses control signals for controlling the contents providing apparatuses; a control signal receiver for receiving control signals from the remote control units belonging respectively to the contents providing apparatuses; a signal discriminator for judging to which contents providing apparatuses belong the remote control units that have transmitted the control signals received by the signal receiver; and a selection controller for recognizing, based on the result of the judgment by the signal discriminator, what is indicated by the control signals transmitted from the remote control units and received by the control signal receiver in order to select contents to be monitored and a contents providing apparatus from which to receive the contents.

According to another aspect of the present invention, an electronic appliance is provided with: a signal transmitter/receiver for receiving signals from a plurality of contents providing apparatuses that each provide contents and transmitting to the contents providing apparatuses control signals for controlling the contents providing apparatuses; a control signal receiver for receiving control signals from the remote control units belonging respectively to the contents providing apparatuses; a signal discriminator for judging to which contents providing apparatuses belong the remote control units that have transmitted the control signals received by the signal receiver; a second data table that accommodates the correspondence among the control signals produced by the remote control units belonging to the contents providing apparatuses of the plurality of kinds; and an operation controller for producing, based on control signals transmitted from the remote control unit and received by the control signal receiver, control signals to be transmitted to the contents providing apparatuses. Here, when the control signal receiver receives a first control signal transmitted from a remote controller, the operation controller looks up the first control signal in the second data table to recognize a second control signal for the contents providing apparatus with which communication is currently being conducted, and then transmits the second control signal through the signal transmitter/receiver to the contents providing apparatus with which communication is currently being conducted.

According to still another aspect of the present invention, an electronic appliance is provided with: a signal transmitter/receiver for receiving signals from a plurality of contents providing apparatuses that each provide contents and transmitting to the contents providing apparatuses control signals for controlling the contents providing apparatuses. Here, first a video signal is produced for displaying a list of all selectable contents to permit, in the list displayed according to the video signal, the selection of contents to be monitored, and then the contents providing apparatus that can provide the contents is recognized.

According to the present invention, the provision of a first data table that can cope with all the remote control units belonging to contents providing apparatuses that can be connected for communication permits the electronic appliance to recognize, based on control signals from any remote control unit, selection control signals requested of the electronic appliance. Thus, irrespective of to which contents providing apparatus a given remote control unit belongs, it is possible to select contents to be monitored and the contents providing apparatus that can provide the contents, and then to request the selected contents providing apparatus to transmit the contents to be monitored.

Moreover, the provision of a second data table that can cope with all the remote control units belonging to contents providing apparatuses that can be connected for communication permits control signals for the contents providing apparatus with which communication is currently being conducted to be recognized based on control signals from any remote control unit. Thus, irrespective of to which contents providing apparatus a given remote control unit belongs, it is possible to control the operation of the contents providing apparatus with which communication is currently being conducted. Moreover, it is possible to produce a video signal for displaying a list of the contents that contents providing apparatuses that can be connected for communication can provide so that, in the list displayed according to the video signal, contents to be monitored can be selected. Thus, it is possible to readily select contents without checking which contents providing apparatus can provide the desired contents.

BRIEF DESCRIPTION OF THE DRAWINGS

FIG. 3 is a diagram showing what is accommodated in the data table for apparatus discrimination;

FIG. 4 is a diagram showing what is accommodated in the code correspondence data table that accommodates the correspondence between the operations of recording medium drive apparatuses and signal reception apparatuses and the control codes produced by the remote control units thereof;

FIG. 5 is a diagram showing what is accommodated in the code correspondence data table that accommodates the correspondence between the operations of the electronic appliance and the control codes produced by the remote control units;

FIG. 6 is a diagram showing what is accommodated in the contents data table;

FIG. 16 is a diagram showing what is accommodated in the code correspondence data table that accommodates the correspondence between the control codes for reproducing contents and the control codes produced by the remote control units;

DETAILED DESCRIPTION OF PREFERRED EMBODIMENTS

First Embodiment

Figure 1:
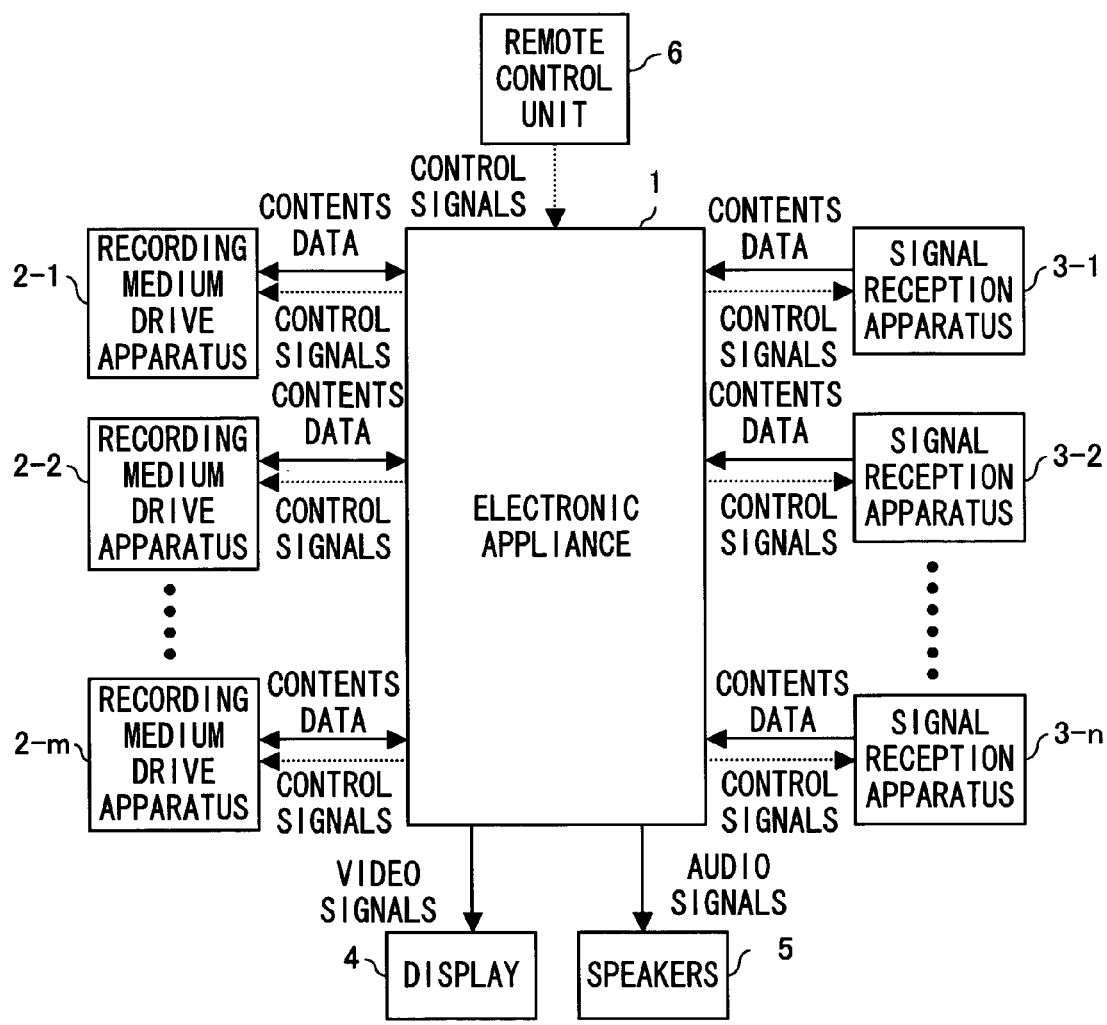
FIG. 1 is a block diagram showing the interconnection between an electronic appliance embodying the invention and electronic appliances.
Figure 2:
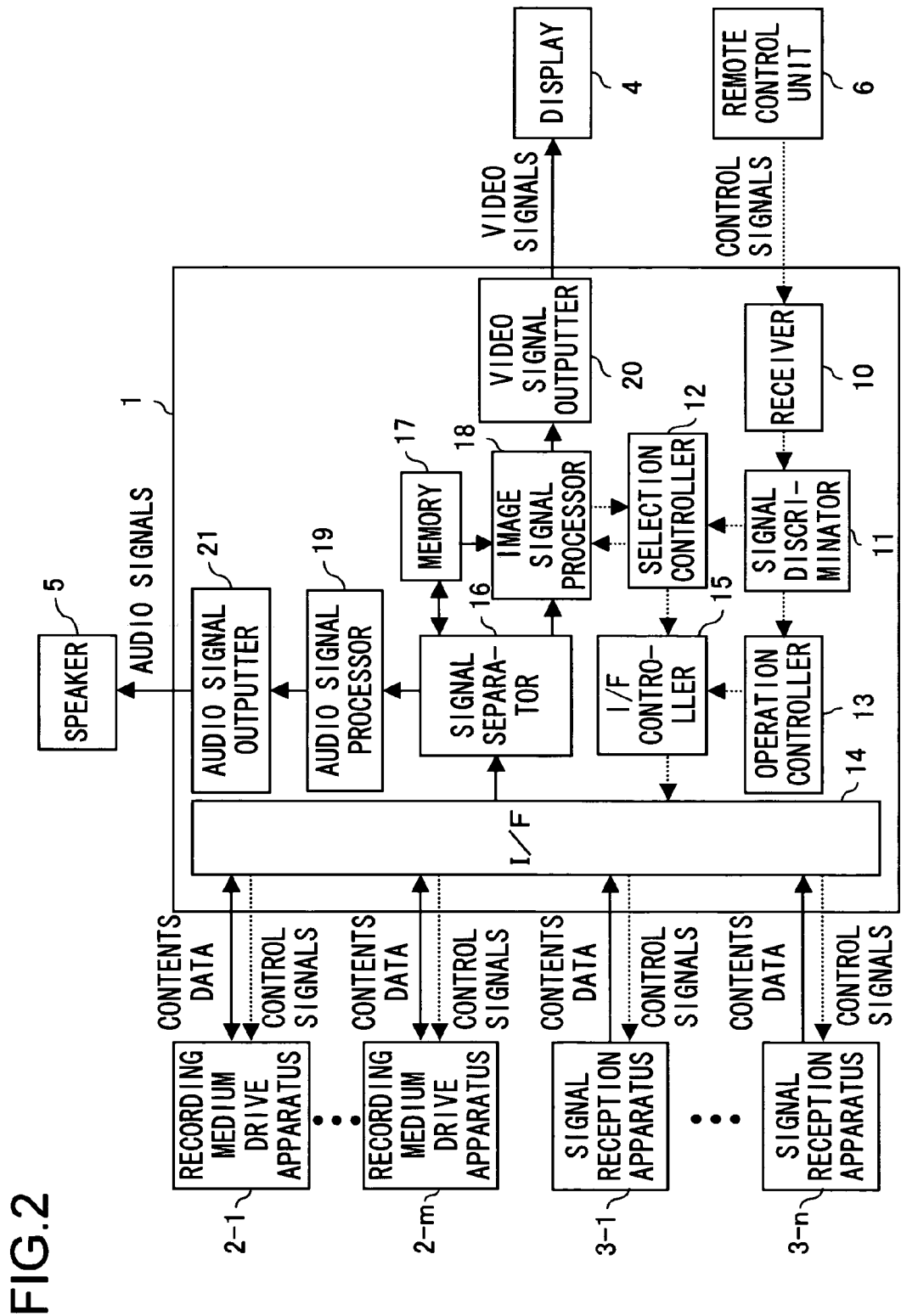
FIG. 2 is a block diagram showing the internal configuration of an electronic appliance embodying the invention.

A first embodiment of the invention will be described below with reference to the relevant drawings. FIG. 1 is a block diagram showing the interconnection between the electronic appliance of this embodiment and external appliances. FIG. 2 is a block diagram showing the internal configuration of the electronic appliance of this embodiment.

As shown in FIG. 1, the electronic appliance 1 of this embodiment is connected, on a wireless- or wired-communication basis, to recording medium drive apparatuses 2-1 to 2-m for recording and reproducing contents to and from recording media and signal reception apparatuses 3-1 to 3-n for receiving broadcast signals and downloaded data. The electronic appliance 1 receives signals including contents data from the recording medium drive apparatuses 2-1 to 2-m and the signal reception apparatuses 3-1 to 3-n, and transmits control signals to the recording medium drive apparatuses 2-1 to 2-m and the signal reception apparatuses 3-1 to 3-n to control the operation thereof and for other purposes. Moreover, the electronic appliance 1 transmits video signals obtained from the received contents data to a display 4, and transmits audio signals obtained from the received contents data to speakers 5. Furthermore, the electronic appliance 1 receives infrared signals transmitted from a remote control unit 6.

Here, the recording medium drive apparatuses 2-1 to 2-m may be apparatuses that read contents data from read-only recording media such as DVDs and CDs or apparatuses that write and read contents data to and from recordable or rewritable recording media such as video tapes, CD-Rs, DVD-RAMs, MDs, and hard disks. Of the recording medium drive apparatuses 2-1 to 2-m, those that can record data to recordable or rewritable recording media receive contents data from the electronic appliance 1. The signal reception apparatuses 3-1 to 3-n may be tuner apparatuses that receive broadcast signals of terrestrial broadcasting, radio broadcasting, satellite broadcasting, digital television broadcasting, cable television broadcasting, and the like, or may be network apparatuses that receive video, audio, and other contents data by downloading them over the Internet.

As shown in FIG. 2, the electronic appliance 1 includes: a receiver 10 that receives infrared signals from the remote control unit 6; a signal discriminator 11 that checks whether a control signal transmitted from the remote control unit 6 and received by the receiver 10 is a selection control signal for selecting contents or an operation control signal for controlling the operation of any of the recording medium drive apparatuses 2-1 to 2-m, the signal reception apparatuses 3-1 to 3-n, and the electronic appliance 1 itself; a selection controller 12 to which selection control signals recognized as such by the signal discriminator 11 are fed; an operation controller 13 to which operation control signals recognized as such by the signal discriminator 11 are fed; an interface (I/F) 14 that is connected to each of the recording medium drive apparatuses 2-1 to 2-m and the signal reception apparatuses 3-1 to 3-n to exchange signals therewith; an I/F controller 15 that controls the I/F 14 to select which apparatus to communicate with; a signal separator 16 that separates the signals received by the I/F 14 into video, audio, and data signals; a contents list memory 17 that stores text data representing a contents list obtained from the data signals separated by the signal separator 16 and figure data used when a list is displayed; a video signal processor 18 that converts the video signals separated by the signal separator 16 into signals that can be handled by the display 4; an audio signal processor 19 that converts the audio signals separated by the signal separator 16 into signals that can be handled by the speakers 5; a video signal outputter 20 that outputs the video signals from the video signal processor 18 to the display 4; and an audio signal outputter 21 that outputs the audio signals from the audio signal processor 19 to the speakers 5.

Operations for Setting Data Tables

The electronic appliance 1 configured as described above operates in the following manner. When a recording medium drive apparatus 2 (corresponding to the recording medium drive apparatuses 2-1 to 2-m in FIG. 1) or a signal reception apparatus 3 (corresponding to the signal reception apparatuses 3-1 to 3-n in FIG. 1) is newly connected to the I/F 14, the I/F controller 15 detects the number of the port of the I/F 14 to which it is connected. The I/F 14 achieves connection on a wireless- or wired-communication basis. Alternatively, the configuration may be such that, when the remote control unit 6 or an unillustrated input portion is operated by the user, a recording medium drive apparatus 2 or a signal reception apparatus 3 is recognized to be newly connected to the I/F 14. When the electronic appliance 1 recognizes a recording medium drive apparatus 2 or a signal reception apparatus 3 to be newly connected to the I/F 14 in this way, the manufacturer and model of the recording medium drive apparatus 2 or signal reception apparatus 3 thus connected are identified through communication therewith via the I/F 14 or through the operation of the remote control unit 6 or unillustrated input portion by the user.

Here, there is previously provided a model-specific information table in which are stored, for all the models of each manufacturer, the model-specific information added to control signals transmitted from the remote control units designed to work respectively with those models and the various control codes that represent instructions for operating the apparatuses. From this model-specific information table, the model-specific information and various control codes corresponding to the manufacturer and model of the recording medium drive apparatus 2 or signal reception apparatus 3 connected are read out. If no information relevant to the manufacturer and model recognized is stored in the model-specific information table, or no model-specific information table exists, the electronic appliance 1 may communicate over the Internet with a server apparatus provided with a model-specific information table to download information relevant to the manufacturer and model recognized.

When the model-specific information and various control codes corresponding to the recording medium drive apparatus 2 or signal reception apparatus 3 connected are identified, the signal discriminator 11 generates an apparatus discrimination data table as shown in FIG. 3 containing the manufacturer and model of the recording medium drive apparatus 2 or signal reception apparatus 3 connected, the model-specific information from the remote control unit thereof, and the port number of the port of the I/F 14 to which it is connected. Moreover, the signal discriminator 11 simultaneously generates, by using the various control codes of the recording medium drive apparatus 2 or signal reception apparatus 3 newly connected, a code correspondence data table as shown in FIG. 4 or 5 that accommodates the correspondence between the various operations of the recording medium drive apparatuses 2 and signal reception apparatuses 3 connected and the electronic appliance 1 itself and the various control codes. That is, this code correspondence data table accommodates the correspondence between the operations of the recording medium drive apparatuses 2 and signal reception apparatuses 3 connected and the electronic appliance 1 itself and the various control codes produced by the remote control units belonging respectively to the recording medium drive apparatuses 2 and signal reception apparatuses 3 connected.

Once an apparatus discrimination data table as shown in FIG. 3 is generated in this way, by using the apparatus discrimination data table, it is possible to identify the manufactures and models of the recording medium drive apparatuses 2 and signal reception apparatuses 3 corresponding to the remote control unit 6 that transmits infrared signals to the receiver 10. It is also possible to identify the ports of the I/F 14 to which the recording medium drive apparatuses 2 and the signal reception apparatuses 3 specified by the remote control unit 6 are connected. On the other hand, once a code correspondence table as shown in FIG. 4 that covers every one of the recording medium drive apparatuses 2 and signal reception apparatuses 3 and a code correspondence table as shown in FIG. 5 that covers the electronic appliance 1 are generated, it is possible to identify, based on control codes recognized from control signals from the remote control unit 6, the operations specified for the electronic appliance 1 or the recording medium drive apparatuses 2 and signal reception apparatuses 3.

Moreover, a contents data table as shown in FIG. 6 that accommodates apparatus-by-apparatus classified information of the contents stored on the recording media mounted in the recording medium drive apparatuses 2 is generated, and is stored in the contents list memory 17. This contents data table is generated by the signal separator 16 and is stored in the contents list memory 17 when a new recording medium is mounted in any of the recording medium drive apparatuses 2 or when new contents are recorded to the recording medium of any of the recording medium drive apparatuses 2. This contents data table may be generated automatically when a recording medium is mounted or a recording operation is performed, or in response to the operation of the remote control unit 6 or unillustrated input portion by the user.

In a case where a new recording medium is mounted in any of the recording medium drive apparatuses 2, contents names or program names and broadcast times or broadcast channels and broadcast times that represent the contents stored on the newly mounted recording medium are transmitted along with sub data such as their playback durations. Specifically, if the recording medium is a recording medium such as a DVD having video signals recorded thereto on a read-only basis, contents information consisting of contents names that represent the contents stored thereon and sub data containing their playback durations and chapter list is transmitted from the recording medium drive apparatus 2. If the recording medium is a recording medium such as a CD having audio signals recorded thereto on a read-only basis, contents information consisting of contents names that represent all the contents, such as pieces of music, stored thereon and sub data containing the playback durations of the individual contents is transmitted from the recording medium drive apparatus 2.

If the recording medium is a recording medium such as a video tape or hard disk to and from which video signals can be recorded and reproduced, contents list information consisting of contents names or program names and broadcast times or broadcast channels and broadcast times that represent all the contents stored thereon and sub data containing the playback durations of the individual contents is transmitted from the recording medium drive apparatus 2. If the recording medium is a recording medium such as a MD to and from which audio signals can be recorded and reproduced, contents list information consisting of contents names or broadcast channels and broadcast times that represent all the contents, such as pieces of music, stored thereon and sub data containing the playback durations of the individual contents is transmitted from the recording medium drive apparatus 2. When the electronic appliance 1 is connected to the Internet, program names may be obtained by acquiring an EPG (electronic program guide) over the Internet and then looking up broadcast channels and broadcast times.

In a case where new contents are recorded to the recording medium mounted in any of the recording medium drive apparatuses 2, contents names or program names and broadcast times or broadcast channels and broadcast times that represent the newly recorded contents are transmitted along with sub data such as their playback durations. If the recording medium is a recording medium such as a video tape or hard disk to and from which video signals can be recorded and reproduced, contents information consisting of contents names or program names and broadcast times or broadcast channels and broadcast times that represent the newly recorded contents and sub data containing the playback durations of those contents is transmitted from the recording medium drive apparatus 2. If the recording medium is a recording medium such as a MD to and from which audio signals can be recorded and reproduced, contents list information consisting of contents names or broadcast channels and broadcast times that represent all the newly recorded contents, such as pieces of music, and sub data containing the playback durations of those contents is transmitted from the recording medium drive apparatus 2.

When contents list information or contents information transmitted from a recording medium drive apparatus 2 in this way is received by the I/F 14, the signal separator 16 recognizes it as contents list information or contents information. Here, by looking up in the apparatus discrimination data table shown in FIG. 3 the port number of the port of the I/F 14 via which the contents list information or contents information has been received, the manufacturer and model of the recording medium drive apparatus 2 that has transmitted the contents list information or contents information are identified.

Then, for each recording medium drive apparatus 2 that has transmitted contents list information or contents information, a contents data table as shown in FIG. 6 in which the contents identified from the contents list information or contents information are classified is generated, and is stored in the contents list memory 17. Thus, in the contents data table, contents are classified according to which recording medium drive apparatus 2 they belong to, and in addition the kinds of the contents and their sub data are stored together. Here, to distinguish recording medium drive apparatuses 2 of the same model, in the contents data table shown in FIG. 6, the port numbers of the ports to which the recording medium drive apparatuses 2 are connected are also stored.

The operations performed to generate the apparatus discrimination data table, the code correspondence data table, and the contents data table are performed as initial setting operations. Thus, the operations for generating those tables may be performed when the electronic appliance is turned on. The same operations for generating the data tables are performed also in the second embodiment described later.

Operations for Selecting Models and Contents

Once the data tables have been generated through the initial setting operations as described above, a stand-by state lasts until infrared communication using the remote control unit 6 occurs. Now, the operations performed when the stand-by state is started in this way will be described, first with reference to the flow chart in FIG. 7. When the stand-by state is started, the video signal processor 18 reads, from the apparatus discrimination data table shown in FIG. 3, the recording medium drive apparatuses 2 and signal reception apparatuses 3 connected to the I/F 14, and then displays a list thereof as shown in FIG. 8 on the display 4 (STEP 1).

At this time, the video signal for displaying a list of the recording medium drive apparatuses 2 and signal reception apparatuses 3 read out from the apparatus discrimination data table is generated by the video signal processor 18, and is outputted through the audio signal processor 19 to the display 4. Thus, as shown in FIG. 8, a list of the models of the recording medium drive apparatuses 2 and signal reception apparatuses 3 connected to the electronic appliance 1 is displayed on the display 4. The data of this list of the apparatuses is fed also to the selection controller 12 so that the apparatus pointed by a pointer is recognized by the selection controller 12.

Figure 8:
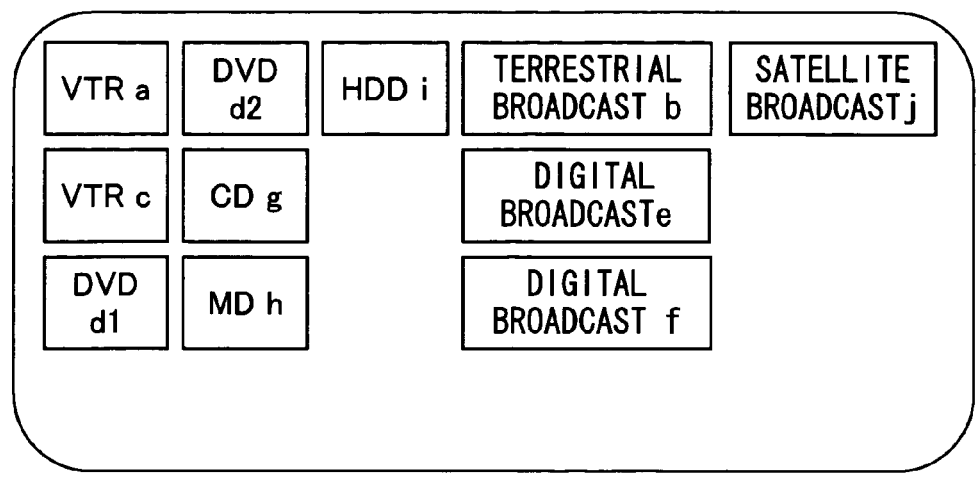
FIG. 8 is a diagram showing the display of a list of models.

The displayed list shown in FIG. 8 shows that the connected recording medium drive apparatuses 2 are VTRs of models "a" and "c", a DVD player of model "d", a CD player of model "g", an MD player of model "h", and a hard disk drive of model "i", and that the connected signal reception apparatuses 3 are a terrestrial television tuner of model "b", digital television tuners of models "e" and "f", and a satellite broadcast tuner of model "j". In FIG. 8, the models and types of the apparatuses shown are arranged in a matrix; it is, however, also possible to show them one under another in a vertical list. In a case where two or more recording medium drive apparatuses 2 or signal reception apparatuses 3 of the same model are connected, they are distinguished by giving different numbers to them. Specifically, when two DVD players of model d are connected, they are shown as models d1 and d2 in the displayed list.

Then, whether or not an infrared signal from the remote control unit 6 is received is checked by the receiver 10 (STEP 2). In this STEP 2, the operation for checking whether or not an infrared signal is received is continued until one is received by the receiver 10. If, in STEP 2, an infrared signal from the remote control unit 6 is found to be received (Yes), the signal discriminator 11 looks up in the apparatus discrimination data table the model-specific information contained in the control signal represented by the infrared signal to identify the manufacturer and model of the apparatus to which the remote control unit 6 belongs (STEP 3).

Specifically, if the model-specific information recognized in the infrared signal received in STEP 2 is "code 1", the remote control unit 6 is identified as the remote control unit belonging to, among the connected recording medium drive apparatuses 2, the VTR of model "a" manufactured by manufacturer "A". By contrast, if the model-specific information recognized in the infrared signal received in STEP 2 is "code 2", the remote control unit 6 is identified as the remote control unit belonging to, among the connected signal reception apparatuses 3, the terrestrial television tuner of model "b" manufactured by manufacturer "B".

Then, the signal discriminator 11 looks up in the code correspondence data table shown in FIG. 5 the control code of the control signal represented by the infrared signal to identify the operation of the electronic appliance 1 indicated by the control code (STEP 4). Specifically, according to the code correspondence data table shown in FIG. 5, the movement directions (up, down, left, and right) for setting the coordinate position of the pointer for specifying models and contents shown in the list displayed on the display 4, the enter command (enter) for deciding on the model or contents located at the coordinate position specified by the pointer, and the cancellation command (cancel) for returning to the previous screen are identified.

According to the code correspondence data table, for example as shown in FIG. 5, the remote control unit of the VTR of model "a" has control codes "play", "stop", "tune up" for incrementing the channel by one, "tune down" for decrementing the channel by one, "fast forward", and "rewind", and these codes respectively represent "enter", "cancel", "up", "down", "right", and "left"; the remote control unit of the VTR of model "c" has control codes "play" and "stop" and numeric codes "8", "2", "6", and "4", and these codes respectively represent "enter", "cancel", "up", "down", "right", and "left"; the remote control unit of the terrestrial television tuner of model "b" has, as control codes, channel codes "5", "11", "2", "8", "6", and "4", and these codes respectively represent "enter", "cancel", up "down", "right", and "left"; and the remote control units of the digital television tuners of models "e" and "f" and the satellite broadcast tuner of model "j" have, as control codes, channel codes "5", "0", "8", "2", "6", and "4", and these codes respectively represent "enter", "cancel", "up", "down", "right", and "left".

The remote control units of the DVD player of model "d" and the hard disk drive of model "i" have control codes "enter", "cancel", "up", "down", "right", and "left", and these codes respectively represent "enter", "cancel", "up", "down", "right", and "left"; the remote control unit of the CD player of model "g" has control codes "play", "stop", "volume up" for increasing the volume, "volume down" for decreasing the volume, "next", and "previous", and these codes respectively represent "enter", "cancel", "up", "down", "right", and "left"; and the remote control unit of the MD player of model "h" has control codes "play", "stop", "next", "previous", "fast forward", and "rewind", and these codes respectively represent "enter", "cancel", "up", "down", "right", and "left".

When the specified operation is identified according to the code correspondence data table shown in FIG. 5 in this way, whether or not the control code represents "enter" to specify deciding on a particular apparatus is checked (STEP 5). Here, if no decision on a particular apparatus is specified (No), the control code is for specifying "up", "down", "right", or "left". Accordingly, the selection controller 12 instructs the video signal processor 18 to move the coordinate position of the pointer (STEP 6), and then the operation flow returns to STEP 2. On the other hand, if a decision on a particular apparatus (Yes) is found to be specified, the apparatus indicated by the pointer is selected (STEP 7), and then whether or not the selected apparatus is a recording medium drive apparatus 2 is checked (STEP 8). At this time, the port number identified according to the apparatus discrimination data table is fed to the I/F controller 15 to specify the port of the I/F 14 to which the selected recording medium drive apparatus 2 or signal reception apparatus 3 as identified based on that port number is connected.

If the apparatus thus decided on is a recording medium drive apparatus 2 (Yes), the contents data table shown in FIG. 6 stored in the contents list memory 17 is referred to so that the contents information of the contents stored in the apparatus decided on is read therefrom by the video signal processor 18 (STEP 9). Then, according to the contents information read out by the video signal processor 18, a list of contents names or program names and broadcast times or broadcast channels and broadcast times of the contents stored in the specified apparatus is created, and is outputted from the video signal outputter 20 so as to be displayed on the display 4.

Figure 9A:
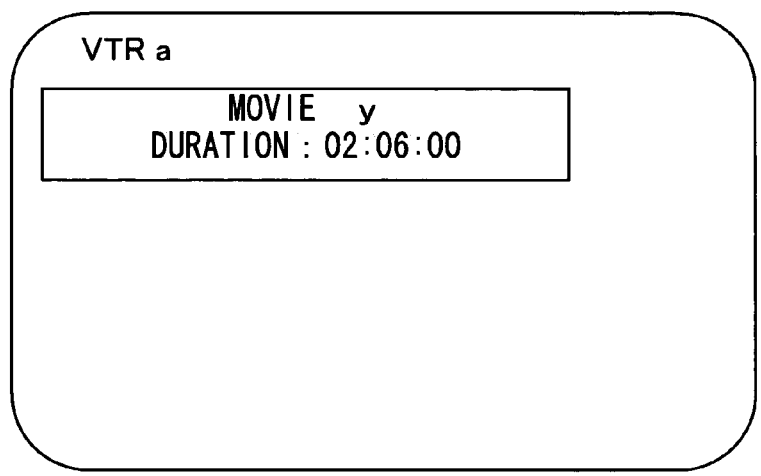
FIGS. 9A and 9B are diagrams showing the display of lists of contents of a VTR.
Figure 9B:
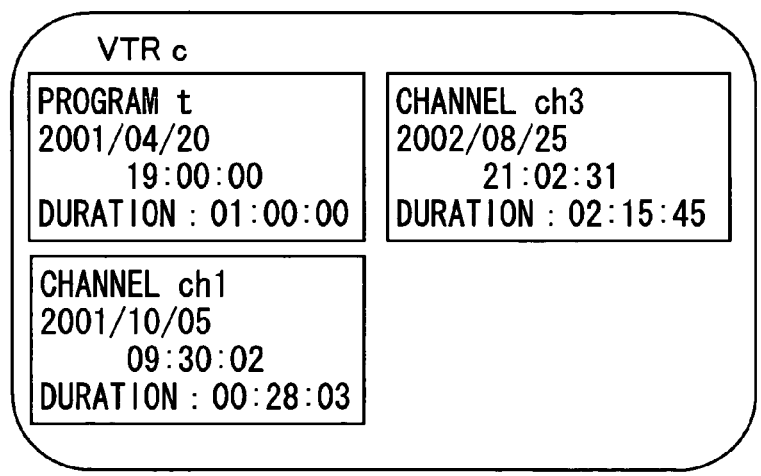
Figure 10:
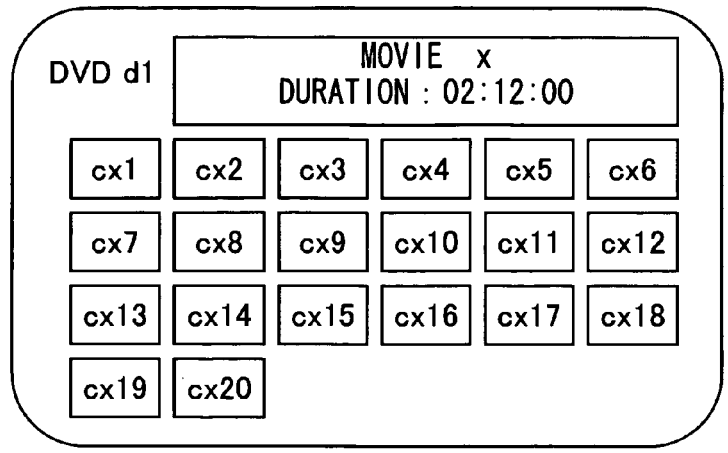
FIG. 10 is a diagram showing the display of a list of contents of a DVD.
Figure 11:
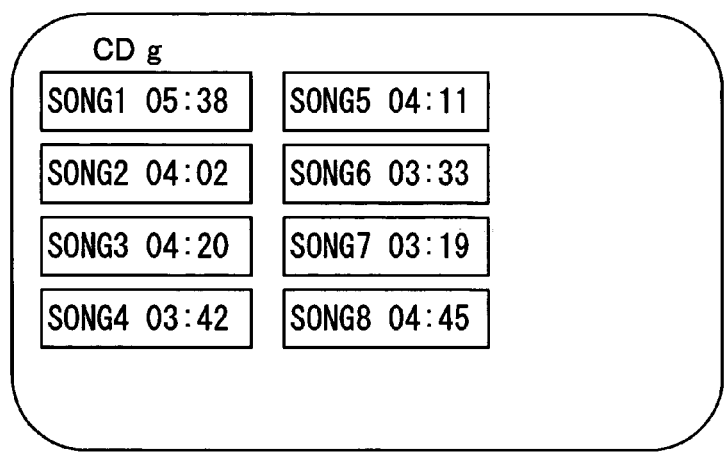
FIG. 11 is a diagram showing the display of a list of contents of a CD or MD.
Figure 12:
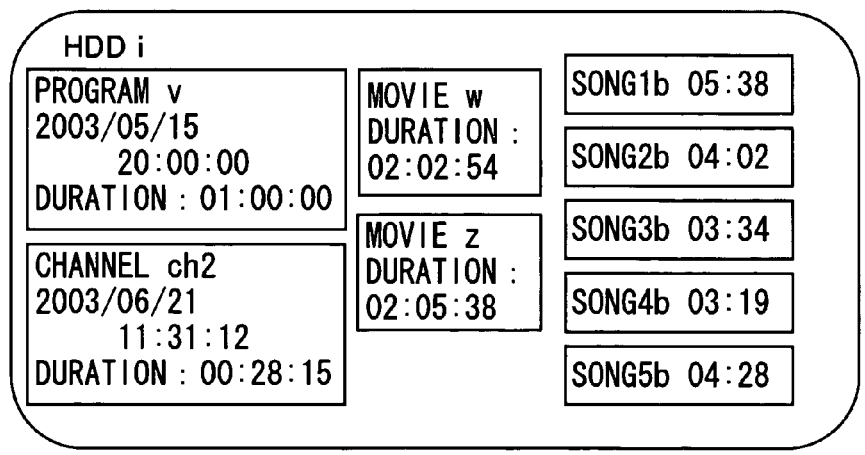
FIG. 12 is a diagram showing the display of a list of contents of a hard disk.

Accordingly, for example, when a VTR is specified, as shown in FIG. 9A, a title as a contents name is shown along with a playback duration, or, as shown in FIG. 9B, program names are shown along with broadcast times (recording start times) and playback durations or broadcast channels are shown along with broadcast times (recording start times) and playback durations. When a DVD player is specified, as shown in FIG. 10, a title as a contents name is shown along with a playback duration and the images of individual chapters. When a CD player or MD player is specified, as shown in FIG. 11, the titles of individual pieces of music as contents names are shown along with durations. When a hard disk drive is specified, as shown in FIG. 12, video contents and audio contents are shown separately; for video contents, titles as contents names are shown, or program names are shown along with broadcast times (recording start times) and playback durations or broadcast channels are shown along with broadcast times (recording start times) and playback durations; for audio contents, the titles of individual pieces of music as contents names are shown along with durations.

When a contents list is displayed on the display 4 in this way, operations similar to those performed in STEP 2 through STEP 4 are performed to identity the manufacturer and model of the apparatus to which the remote control unit 6 that has transmitted the infrared signal belongs and to identify the operation of the electronic appliance 1 indicated by the control code contained in the control signal represented by the transmitted infrared signal (STEP 10 through STEP 12). Then, whether or not the operation of the electronic appliance 1 indicated by the control code is "cancel" is checked (STEP 13). Here, if "cancel" is specified to return to the list of models for the selection of another apparatus to be operated (Yes), the operation flow returns to STEP 1.

On the other hand, if "cancel" is not specified (No), then, as in STEP 5, whether or not the control code represents "enter" is checked (STEP 14). If "enter" is not specified (No), then, as in STEP 6, the coordinate position of the pointer is moved (STEP 15), and then the operation flow returns to STEP 10. On the other hand, if "enter" is specified (Yes), the contents indicated by the pointer is selected (STEP 16), and then the operation flow proceeds to the operations for operating the recording medium drive apparatus 2 (STEP 17). If, in STEP 8, the apparatuses decided on is a signal reception apparatus 3 and not a recording medium drive apparatus 2 (No), the operation flow proceeds to the operations for operating the signal reception apparatus 3 (STEP 17).

In STEP 16, when a recording medium drive apparatus 2 is selected, a control signal for demanding the transmission of the contents data of the selected contents is generated by the selection controller 12, and is transmitted to the recording medium drive apparatus 2 via the selected port of the I/F 14; when a signal reception apparatus 3 is selected, a control signal for demanding the transmission of contents data based on the received broadcast signal is generated by the selection controller 12, and is transmitted to the signal reception apparatus 3 via the selected port of the I/F 14.

Operations for Controlling the Apparatuses

Figure 7:
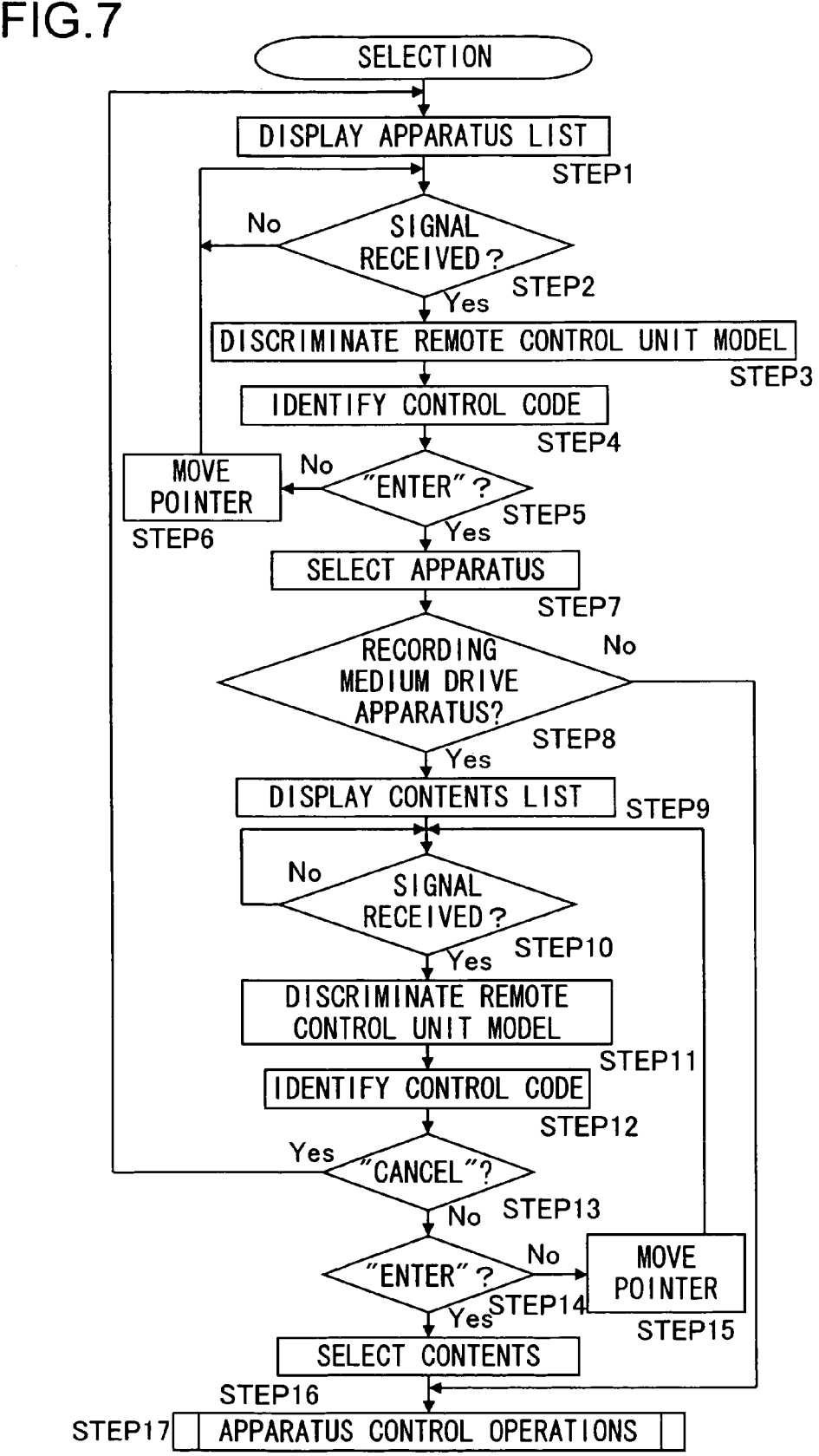
FIG. 7 is a flow chart showing the operations performed by the electronic appliance of a first embodiment of the invention to select apparatuses and contents.
Figure 13:
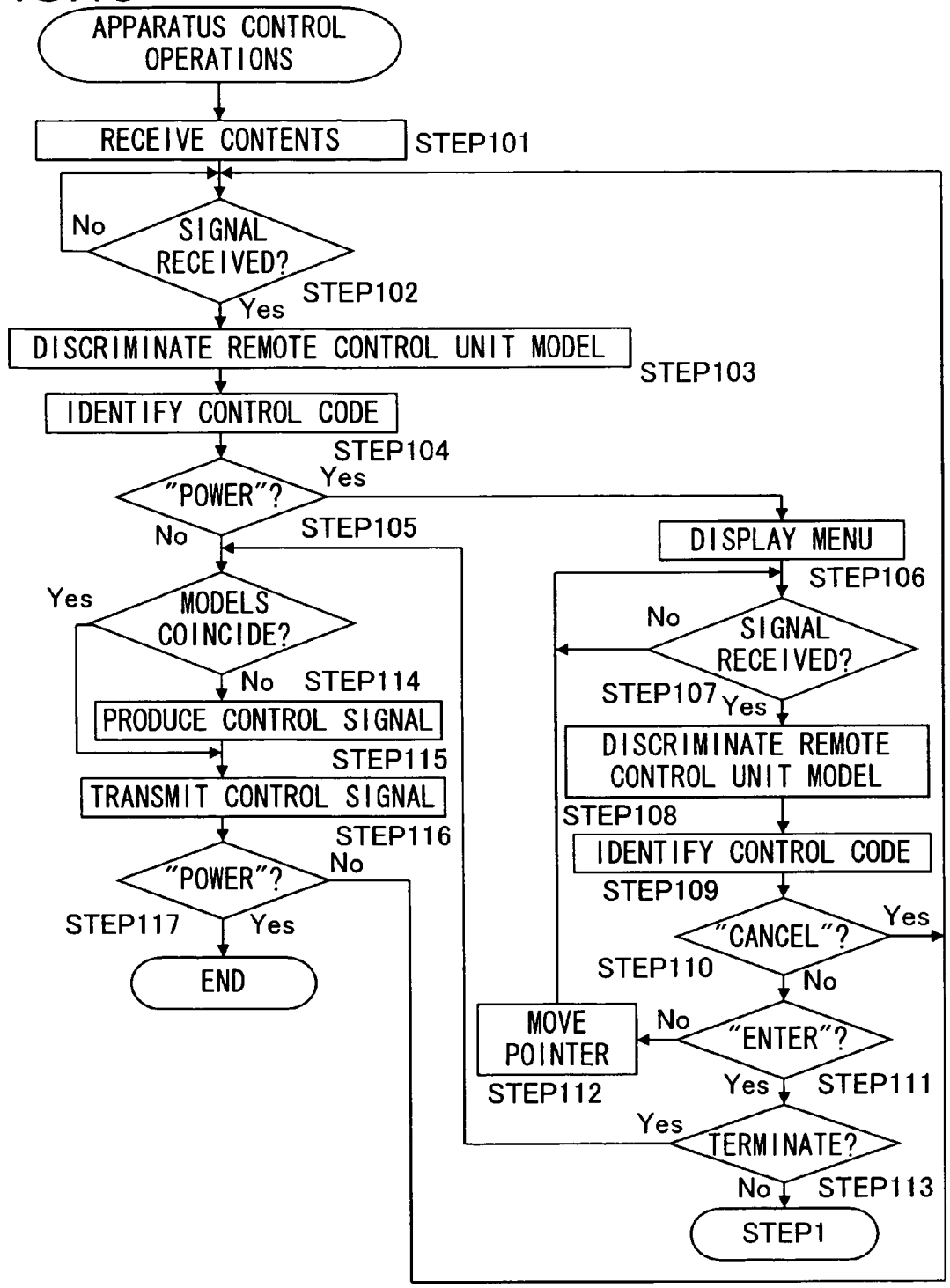
FIG. 13 is a flow chart of the operations performed by the electronic appliance of the first embodiment to control apparatuses.

When, through the operations according to the flow chart shown in FIG. 7, the signal reception apparatus 3 or recording medium drive apparatus 2 to be operated and the contents to be monitored are selected, then, as shown in the flow chart shown in FIG. 13, the contents data transmitted from the recording medium drive apparatus 2 or signal reception apparatus 3 operated are received (STEP 101). Specifically, in a case where the signal reception apparatus 3 was found to be selected in STEP 8 and then the operation flow proceeded to STEP 17, the contents data obtained from the broadcast signal received by tuning in to the channel at which the selected signal reception apparatus 3 is currently set are transmitted; by contrast, in a case where the contents in the recording medium drive apparatus 2 were selected in STEP 16 and then the operation flow proceeded to STEP 17, the contents data of the selected contents are read out from the recording medium by the recording medium drive apparatus 2 and are then transmitted.

Here, when the contents data from the recording medium drive apparatus 2 or signal reception apparatus 3 is received by the I/F 14, it is then separated into video and audio signals by the signal separator 16. Here, for digital data, video and audio signals contained in stream data are separated from each other by being checked on a packet-by-packet basis; for analog data, video and audio signals are separated from each other by being checked according to the timing of synchronization. The thus separated video and audio signals are respectively fed to the video signal processor 18 and the audio signal processor 19. Then, the video signal processor 18 converts the video signal from the signal separator 16 into a video signal that can be handled by the display 4, and the audio signal processor 19 converts the audio signal from the signal separator 16 into an audio signal that can be handled by the speakers 5. The thus converted video and audio signals are then respectively fed through the video signal outputter 20 and the audio signal outputter 21 to the display 4 and the speakers 5. Thus, the display 4 reproduces and displays images, and the speakers 5 reproduce and output sounds.

While the video and audio based on the contents data from the recording medium drive apparatus 2 or signal reception apparatus 3 are being reproduced on the display 4 and from the speakers 5 in this way, operations similar to those performed in STEP 2 and STEP 3 are performed to wait for an infrared signal to be received from the remote control unit 6 (STEP 102), and the manufacturer and model of the apparatus to which the remote control unit 6 that has transmitted the infrared signal belongs is identified (STEP 103). Then, the control code contained in the control signal represented by the infrared signal from the remote control unit 6 (STEP 104) is identified, and then whether or not the identified control code is "power" for turning the power on and off is checked (STEP 105).

Figure 14:
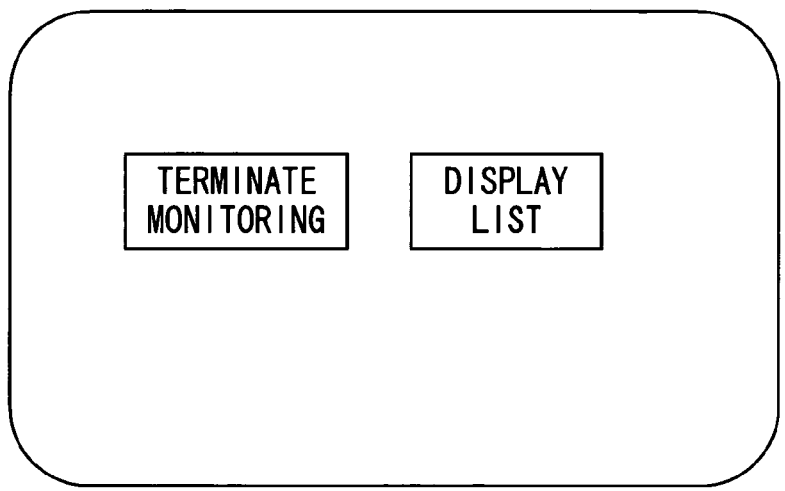
FIG. 14 is a diagram showing the display of a menu that permits the termination of the monitoring of contents and the viewing of the display of a list.
Figure 15:
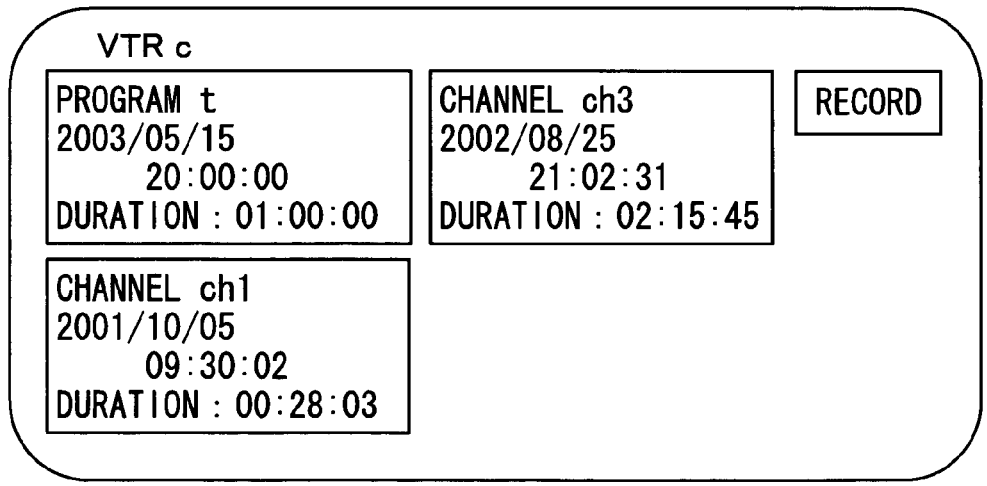
FIG. 15 is a diagram showing another example of the display of a list of contents.

When the control code representing "power" is identified by the signal discriminator 11 (Yes), the video signal processor 18 reads out text data and figure data from the contents list memory 17 and feeds them to the display 4 so that a menu as shown in FIG. 14 is displayed on the display 4 to permit the selection of whether or not to terminate the monitoring of contents (STEP 106). Here, the menu may be displayed by being superimposed on the contents image; or the contents image may be temporarily halted.

Then, as in STEP 10 through STEP 12, the manufacturer and model of the apparatus to which the remote control unit 6 that has transmitted the infrared signal belongs is identified, and the code correspondence data table is referred to so that the operation of the electronic appliance 1 indicated by the control code contained in the control signal represented by the transmitted infrared signal is identified (STEP 107 through STEP 109). Thereafter, as in STEP 13, whether or not the control code is "cancel" is checked (STEP 110). If "cancel" is specified (Yes), the operation flow proceeds to STEP 102. On the other hand, if "cancel" is not specified (No), as in STEP 14, whether or not "enter" is specified is checked (STEP 111). If "enter" is not specified (No), as in STEP 15, the coordinate position of the pointer is moved (STEP 112), and then the operation flow proceeds to STEP 107.

On the other hand, if, in step 111, "enter" is specified (Yes), whether or not the termination of the monitoring of contents is indicated by the pointer is checked (STEP 113). Here, if the display of a list for the selection of contents is specified (No), the operation flow proceeds to STEP 1 in the flow chart shown in FIG. 7 so that the list of the selectable recording medium drive apparatuses 2 and signal reception apparatuses 3 is displayed and the operations in the flow chart shown in FIG. 7 are performed.

On the other hand, if, in STEP 105, the control code is not "power" (No), or if, in STEP 113, the termination of the monitoring of contents is specified (Yes), whether or not the manufacturer and model of the apparatus that is transmitting the contents data currently being received coincide with those of the apparatus to which the remote control unit 6 that has transmitted the infrared signal belongs is checked (STEP 114). If the manufacturers and models coincide (Yes), the control signal represented by the received infrared signal is fed intact from the signal discriminator 11 to the I/F 14 so as to be transmitted via the selected port of the I/F 14 to the selected recording medium drive apparatus 2 or signal reception apparatus 3 (STEP 116).

If the manufacturers and models do not coincide (No), the operation controller 13, by referring to the code correspondence data table shown in FIG. 4, converts the control code contained in the control signal into a control code that suits the recording medium drive apparatus 2 or signal reception apparatus 3 to produce a control signal (STEP 115). Then, the produced control signal is fed from the operation controller 13 to the I/F 14 so as to be transmitted via the selected port of the I/F 14 to the selected recording medium drive apparatus 2 or signal reception apparatus 3 (STEP 116).

When the operation controller 13 converts control signals in this way, for example if the apparatus selected to transmit contents data is the VTR of model "a", the control codes "play", "stop", "fast forward", "rewind", and "record video" of this VTR of model "a" are respectively assigned to different control codes of each other model. Specifically, the remote control unit of the terrestrial television tuner of model "b" has control codes "5", "11", "6", "4", and "2", and these codes respectively represent "play", "stop", "fast forward", "rewind", and "record video"; and the remote control units of the digital television tuners of models "e" and "f" and the satellite broadcast tuner of model "j" have control codes "5", "0", "6", "4", and "2", and these codes respectively represent "play", "stop", "fast forward", "rewind", and "record video".

The remote control unit of the DVD player of model "d" has "play", "stop", "fast forward", "rewind", and "enter", and these codes respectively represent "play", "stop", "fast forward", "rewind", and "record video"; the remote control unit of the CD player of model "g" has "play", "stop", "next", "previous", and "volume up", and these codes respectively represent "play", "stop", "fast forward", "rewind", and "record video"; and the remote control unit of the VTR of model "c", the MD player of model "h", and the hard disk drive of model "i" have "play", "stop", "fast forward", "rewind", and "record (including record video and record audio)", and these codes respectively represent "play", "stop", "fast forward", "rewind", and "record video".

If the apparatus selected to transmit contents data is the terrestrial television tuner of model "b", the control codes "channel up" and "channel down" and the channel codes "1" to "12" of this terrestrial television tuner of model "b" are respectively assigned to different control codes of each other model. Specifically, the remote control units of the VTR of model "a" and the MD player of model "h" have control codes "fast forward" and "rewind", and these codes respectively represent "tune up" and "tune down"; the remote control unit of the CD player of model "g" has control codes "next" and "previous", and these codes respectively represent "tune up" and "tune down"; and the remote control units of the DVD player of model "d" and the hard disk drive of model "i" have control codes "right" and "left", and these codes respectively represent "tune up" and "tune down".

The remote control units of the VTR of model "c", the digital television tuners of models "e" and "f", and the satellite broadcast tuner of model "j" have control codes "tune up" and "tune down", and these codes respectively represent "tune up" and "tune down". Furthermore, the VTR of model "c", the digital television tuners of models "e" and "f", and the satellite broadcast tuner of model "j" have, as control code, numeric codes "0" to "9", and these codes are used to set channel codes "1" to "12".

These examples show how, as shown in FIG. 4, the code correspondence data table accommodates the correspondence between the control codes of the VTR of model "c", the DVD player of model "d", digital television tuners of models "e" and "f", the CD player of model "g", the MD player of model "h", the hard disk drive of model "i", and the satellite broadcast tuner f model "j" and the control codes produced by the remote control units belonging respectively to the apparatuses of models "a" to "j". Thus, by referring to the code correspondence data table shown in FIG. 4, it is possible to identify the control codes of the apparatuses of models "a" to "j" on the basis of the control codes of the remote control units of the apparatuses of models "a" to "j".

When, in STEP 116, the control signal is transmitted to the selected recording medium drive apparatus 2 or signal reception apparatus 3, the selected recording medium drive apparatus 2 and signal reception apparatus 3 performs the operation indicated by the control signal. Thereafter, the electronic appliance 1 checks whether or not the identified control code is "power" (STEP 117). That is, whether or not the control code "power" was identified in STEP 105 is checked once again. Here, if the control code is not "power", the operation flow returns to STEP 102 to perform the operations described above once again. If the control code is "power", the power to the electronic appliance 1 is shut off.

Although not shown in the flow chart in FIG. 7, it is also possible, not only during the operations for controlling the apparatuses but also during the operation for selecting models and contents, to recognize the termination of monitoring and terminate the operation of the electronic appliance 1 when the signal discriminator 11 recognizes the receipt of the control code representing "power".

While contents are being reproduced and outputted, if the apparatus selected in STEP 8 in the flow chart in FIG. 7 is identified as a recording medium drive apparatus 2, then it is also possible, in STEP 9, to display on the display 4 a screen that shows the contents list and in addition permits the selection of the recording of contents. In this case, when the pointer is so moved as to select the recording of contents, the contents data that is currently being reproduced is stored on the recording medium of the selected recording medium drive apparatus 2.

Moreover, when a recording medium drive apparatus 2 is selected, if a control code that specifies the recording of video or audio is identified, it is also possible to perform the operations for selecting models and contents shown in the flow chart in FIG. 7 so that first a recording medium drive apparatus 2 that can provide video or audio contents to be recorded is selected and then video or audio contents to be recorded are selected. It is also possible to perform the operations for selecting models and contents shown in the flow chart in FIG. 7 so that first a signal reception apparatus 3 to be used to receive video or audio contents to be recorded is selected and then a reception channel is set through the operations for controlling apparatuses shown in FIG. 13. This permits contents data transmitted from the newly selected recording medium drive apparatus 2 or signal reception apparatus 3 to be recorded on the recording medium of the recording medium drive apparatus 2.

Second Embodiment

A second embodiment of the invention will be described below with reference to the relevant drawings. The electronic appliance of this embodiment is connected to external appliances as shown in FIG. 1 as in the first embodiment, and has an internal configuration as shown in FIG. 2.

This embodiment differs from the first embodiment in that, when contents are reproduced from a recording medium drive apparatus 2, contents are selected without selecting a recording medium drive apparatus 2, and the various operations performed to reproduce contents are performed as shared control operations. Incidentally, when a broadcast signal received by a signal reception apparatus 3 is reproduced, a signal reception apparatus 3 is selected as in the first embodiment.

In this embodiment, for the purpose of setting the various control codes of the remote control units of the individual apparatuses that are used to control the operations for reproducing the selected contents, a code correspondence data table as shown in FIG. 16 is generated and stored in the signal discriminator 11. In the code correspondence data table shown in FIG. 16, the control codes "play", "stop", "fast forward", and "rewind" and the control code "select contents" for returning to the operations for selecting contents are assigned to different control codes of the remote control units of the individual apparatuses.

Specifically, the remote control units of the VTRs of models "a" and "c" have control codes "play", "stop", "fast forward", "rewind", and "record video", and these codes respectively represent "play", "stop", "fast forward", "rewind", and "select contents"; the remote control unit of the terrestrial television tuner of model "b" has control codes "5", "11", "6", "4", and "2", and these codes respectively represent "play", "stop", "fast forward", "rewind", and "select contents"; and the remote control units of the digital television tuners of models "e" and "f" and the satellite broadcast tuner of model "j" have control codes "5", "0", "6", "4", and "2", and these codes respectively represent "play", "stop", "fast forward", "rewind", and "select contents".

The remote control units of the DVD player of model "d" and the hard disk drive of model "i" have control codes "play", "stop", "fast forward", "rewind", and "cancel", and these codes respectively represent "play", "stop", "fast forward", "rewind", and "select contents"; the remote control unit of the CD player of model "g" has control codes "play", "stop", "next", "previous", and "volume up", and these codes respectively represent "play", "stop", "fast forward", "rewind", and "select contents"; and the remote control unit of the MD player of model "h" has control codes "play", "stop", "fast forward", "rewind", and "previous", and these codes respectively represent "play", "stop", "fast forward", "rewind", and "select contents".

The code correspondence data table shown in FIG. 16 is generated along with the code correspondence data table shown in FIG. 5, and these are stored in the signal discriminator 11. The apparatus discrimination data table shown in FIG. 3 and the code correspondence data table shown in FIG. 4 are also generated and are stored in the signal discriminator 11. Furthermore, the contents data table shown in FIG. 6, which lists all the contents that the connected recording medium drive apparatuses 2 can provide, is stored in the contents list memory 17. Now, how the electronic appliance 1 provided with these tables operates to select and reproduce contents will be described.

Operations for Selecting Contents

As in the first embodiment, once the data tables have been generated through the initial setting operations, a stand-by state lasts until infrared communication using the remote control unit 6 takes place. Now, the operations performed to select contents after the stand-by state is started in this way will be described with reference to the flow chart shown in FIG. 17. When the stand-by state is started, a video signal for displaying a screen that permits the selection of the kind of contents to be reproduced or an operation other than contents reproducing operations is generated from the contents list memory 17 by the video signal processor 18, and is transmitted to the display 4 so that a selection menu as shown in FIG. 18 is displayed on the display 4 (STEP 201). As shown in FIG. 18, displayed on the display 4 are, as kinds of contents, "video contents" and "audio contents" and, as operations other than contents reproducing operations, "broadcast reception" and "contents recording (video or audio recording)".

Then, as in the flow chart in FIG. 7, the operations in STEP 2 through STEP 6 are performed so that, while the code correspondence data table shown in FIG. 5 is referred to, the pointer displayed on the display 4 is moved and whether or not the control code representing "enter" is entered to specify the kind or operation indicated by the pointer is checked.

Then, if, in STEP 5, the control code representing "enter" is recognized (Yes), whether or not one of the kinds of contents displayed is selected is checked (STEP 202).

Here, if the selected choice is not a kind of contents but an operation other than contents reproducing operations (No), the operation flow proceeds to STEP 1 in the flow chart in FIG. 7 to perform, as in the first embodiment, the operations for selecting an apparatus to be operated and contents to be monitored. If a kind of contents is selected (Yes), the selected kind of contents is identified, and contents classified into that kind are searched for from the contents data table within the contents list memory 17; moreover, a contents list of the contents classified into the selected kind is generated by the video signal processor 18 (STEP 203). This contents list is transmitted to the display 4 so that, according to the selected kind of contents, either a contents list of video contents as shown in FIG. 19A or a contents list of audio contents as shown in FIG. 19B is displayed on the display 4.

Figure 19A:
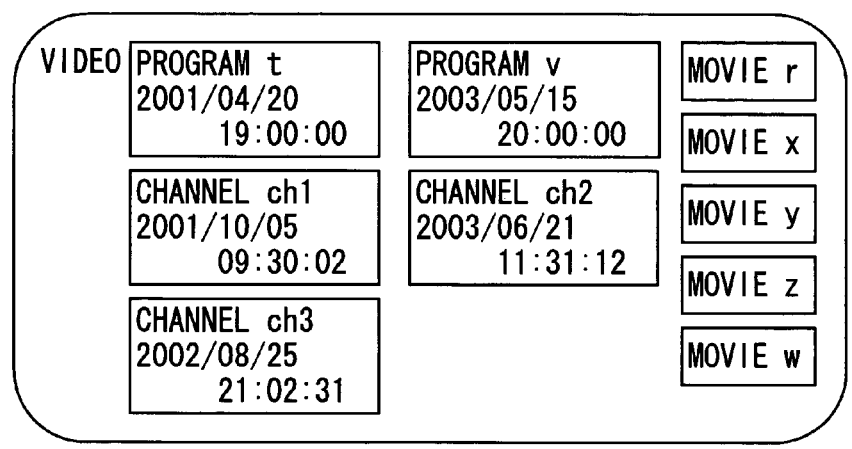
FIGS. 19A and 19B are diagrams showing the display of lists of contents classified by the category.
Figure 19B:
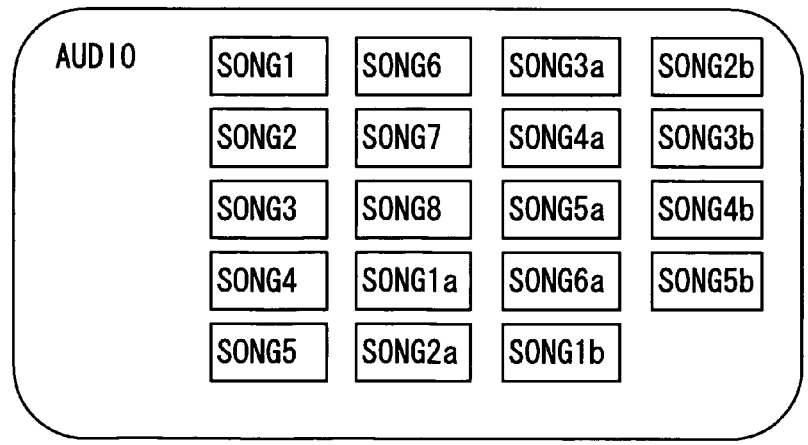

Here, the contents list of video contents shown in FIG. 19A and the contents list of audio contents shown in FIG. 19B are produced by classifying all the contents stored on the recording media of all the recording medium drive apparatuses 2 connected to the electronic appliance 1. For example, in a case where recording medium drive apparatuses 2 as listed in the apparatus discrimination data table shown in FIG. 3 are connected, a contents list of video contents as shown in FIG. 19A is generated by searching for all the video contents stored on the video tape, the DVD, and the hard disk of the VTR of models "a" and "c", the DVD player of model "d", and the hard disk drive of model "i". On the other hand, a contents list of audio contents as shown in FIG. 19B is generated by searching for all the audio contents stored on the CD, the MD, and the hard disk of the CD player of model "g", the MD player of model "h", and the hard disk drive of model "i".

After the contents lists are shown in this way, as in the flow chart in FIG. 7, the operations in STEP 10 through STEP 15 are performed so that the pointer displayed on the display 4 is moved and whether or not the control code representing "enter" is entered to specify the contents indicated by the pointer is checked. Here, if, in STEP 13, the control code representing "cancel" is entered (Yes), the operation flow proceeds to STEP 201 to display the selection menu shown in FIG. 18 on the display 4.

If, in STEP 14, the control code representing "enter" is recognized (Yes), the contents indicated by the pointer are selected (STEP 204), and then, by referring to the contents data table within the contents list memory 17, the recording medium drive apparatus 2 that is provided with the recording medium on which the selected contents are stored is identified (STEP 205). After the selected contents and the recording medium drive apparatus 2 that can reproduce those contents are identified in this way, the operation flow proceeds to operations for controlling the reproduction of contents (STEP 206).

Operations for Reproducing Contents

Figure 17:
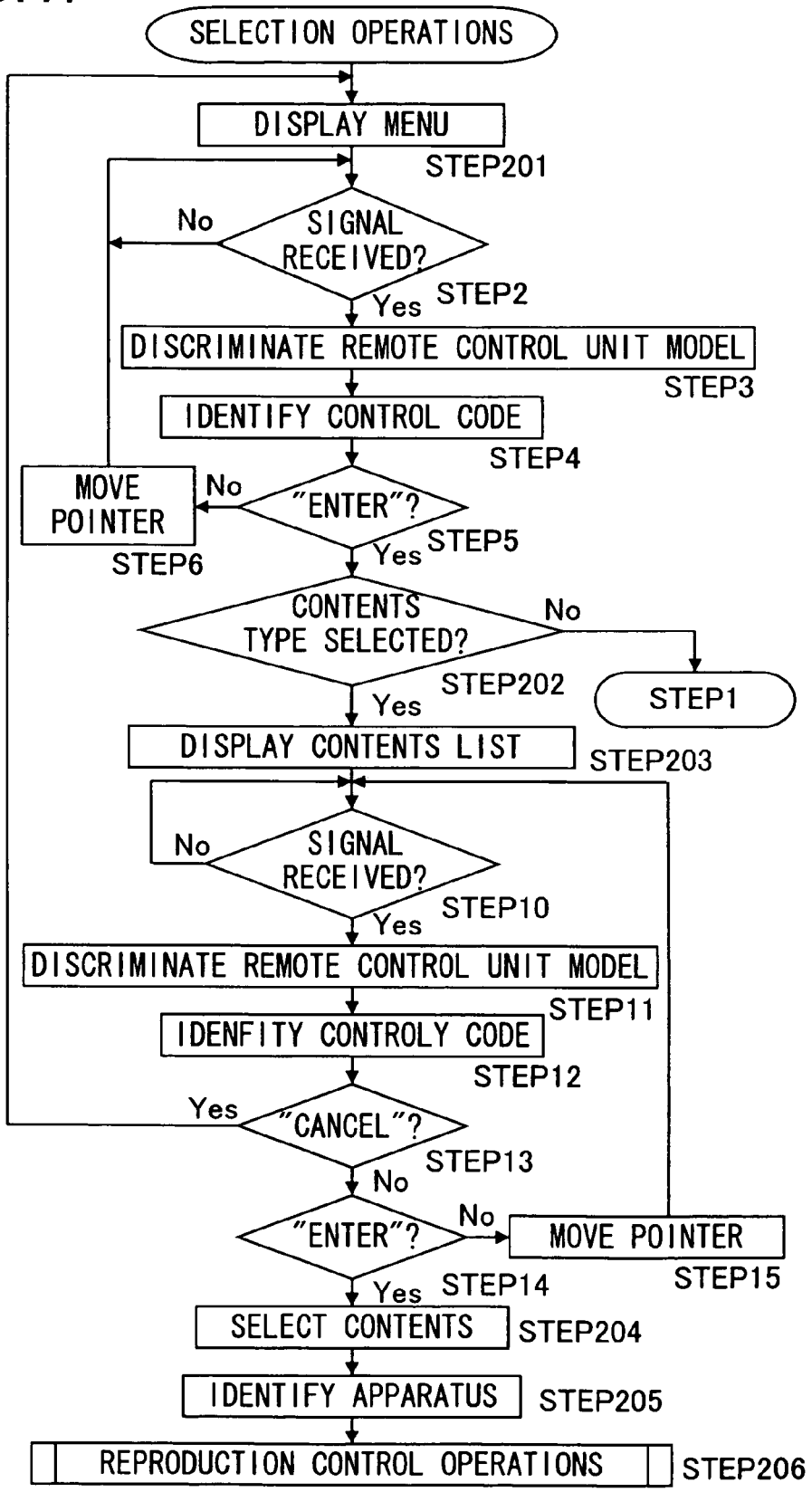
FIG. 17 is a flow chart showing the operations performed by the electronic appliance of a second embodiment of the invention to select contents.
Figure 18:
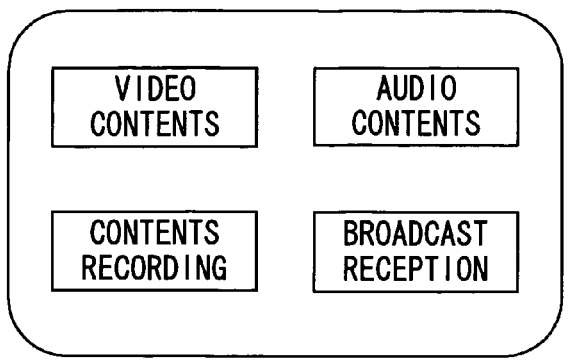
FIG. 18 is a diagram showing the display of a menu that permits the selection of contents by the category.
Figure 20:
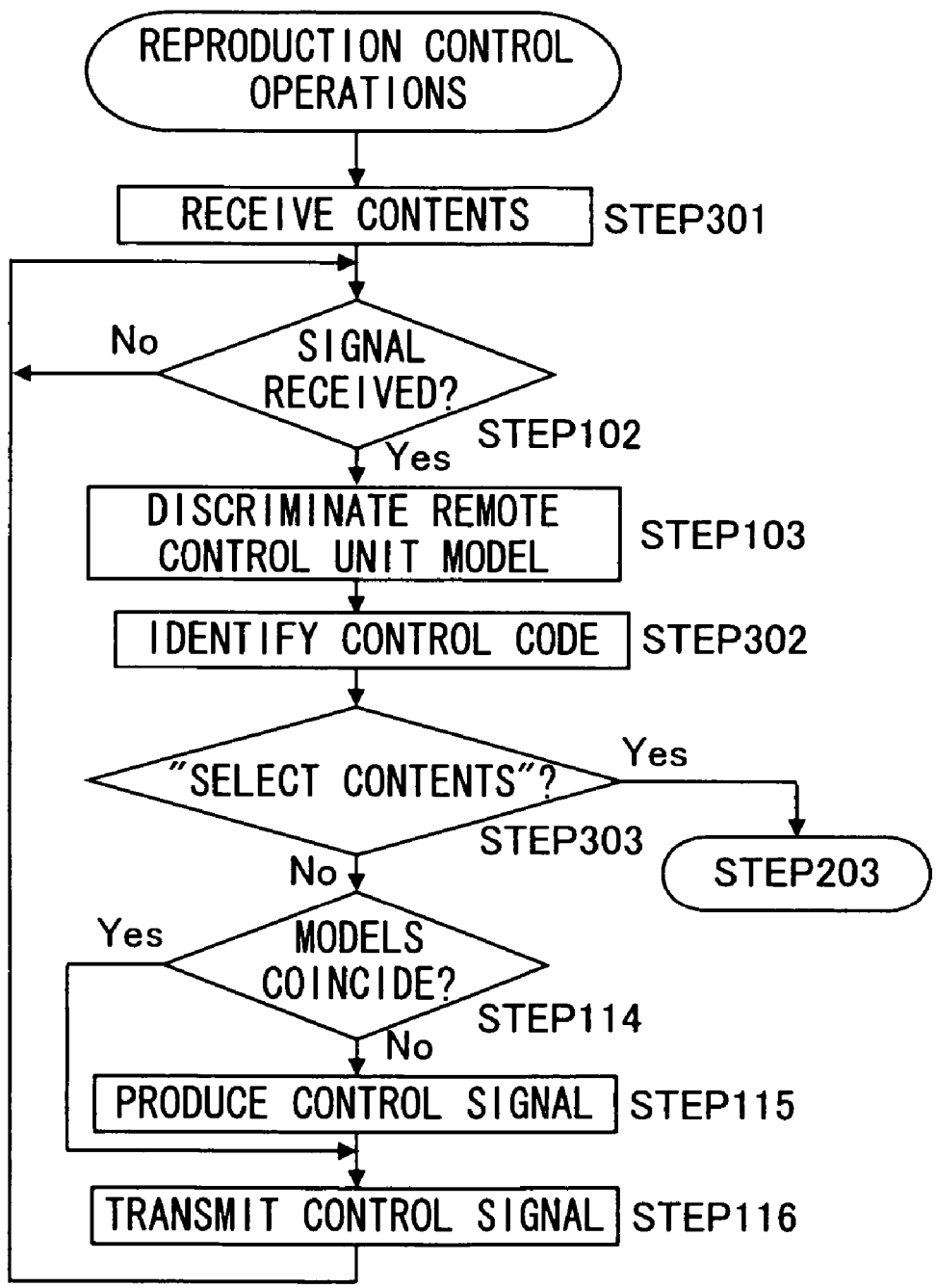
FIG. 20 is a flow chart showing the operations performed by the electronic appliance of the second embodiment to reproduce contents.

When, through the operations according to the flow chart in FIG. 17, the contents to be reproduced are selected, then, as shown in the flow chart in FIG. 20, the contents data transmitted from the recording medium drive apparatus 2 operated are received (STEP 301). Specifically, in the flow chart in FIG. 17, when the operation flow proceeds to STEP 206, the recording medium drive apparatus 2 identified in STEP 205 is requested to transmit the contents data of the contents selected in STEP 204. Here, a control signal for requesting the transmission of the contents data is generated by the selection controller 12. In response, the recording medium drive apparatus 2 identified in STEP 205 reads out and then transmits the contents data of the contents selected in STEP 204. Then, the video and audio signals based on the contents data from the recording medium drive apparatus 2 are transmitted to the display 4 and the speakers 5 so that the selected contents are reproduced.

While the video and audio based on the contents data from the recording medium drive apparatus 2 are being reproduced on the display 4 and from the speakers 5, as in the flow chart in FIG. 13, the operations in STEP 102 and STEP 103 are performed so that, when an infrared signal from the remote control unit 6 is received, the manufacturer and model of the apparatus to which the remote control unit 6 that has transmitted the infrared signal belongs are identified. Then, by referring to the code correspondence data table shown in FIG. 16, the control code contained in the control signal represented by the infrared signal from the remote control unit 6 is identified (STEP 302). Thereafter, whether or not the identified control code is one that represents "select contents" is checked (STEP 303). If the entered code is found to be one that represents "select contents" (Yes), then the operation flow proceeds to STEP 203 in the flow chart in FIG. 17 to display a contents list of contents of the same kind as those reproduced in STEP 301.

On the other hand, if, in STEP 303, the entered code is found to be one other than "select contents" (No), as in the flow chart in FIG. 13, the operations in STEP 114 through STEP 116 are performed. Specifically, if the entered control code is one representing "play", "stop", "fast forward", or "rewind", whether or not the manufacturer and model of the recording medium drive apparatus 2 that is transmitting the contents data that are currently being received coincide with those of the apparatus to which the remote control unit 6 that has transmitted the infrared signal belongs is checked. If the manufacturers and models are found to coincide, the control signal represented by the received infrared signal is transmitted intact to the recording medium drive apparatus 2. On the other hand, if the manufacturers and models do not coincide, by referring to the code correspondence data table shown in FIG. 16, the control code contained in the control signal is converted into a control code that suits the selected recording medium drive apparatus 2 to generate a control signal that is then transmitted thereto. When, in STEP 116, the control signal is transmitted in this way, the selected recording medium drive apparatus 2 operates according to the control signal transmitted from the electronic appliance 1. On completion of the transmission operation in STEP 116, the operation flow returns to STEP 102 so that the electronic appliance 1 performs the above operations again.

In this embodiment, if, in STEP 202 in the flow chart in FIG. 17, one of the operations "broadcast reception" and "contents recording (video or audio recording)" is recognized to be selected, then, according to the flow chart in FIG. 7, it is possible to select a recording medium drive apparatus 2 on which to perform the recording operation or a signal reception apparatus 3 on which to receive the broadcast signal. When an apparatus is selected according to the flow chart in FIG. 7, as in the first embodiment, according to the flow chart in FIG. 13, by referring to the code correspondence data tables shown in FIGS. 4 and 5, the operations for controlling the apparatus are performed.

Although not shown in the flow charts in FIGS. 17 and 20, it is also possible, as in the first embodiment, to recognize the termination of monitoring and terminate the operation of the electronic appliance 1 when the signal discriminator 11 recognizes the receipt of the control code representing "power". When a recording medium drive apparatus 2 is selected, if a control code that specifies the recording of video or audio is identified, it is also possible to perform the operations for selecting contents shown in the flow chart in FIG. 17 or 7 so that a recording medium drive apparatus 2 or a signal reception apparatus 3 that can provide video or audio contents to be recorded is selected. This permits contents data transmitted from the newly selected recording medium drive apparatus 2 or signal reception apparatus 3 to be recorded on the recording medium of the recording medium drive apparatus 2.

Figure 21:
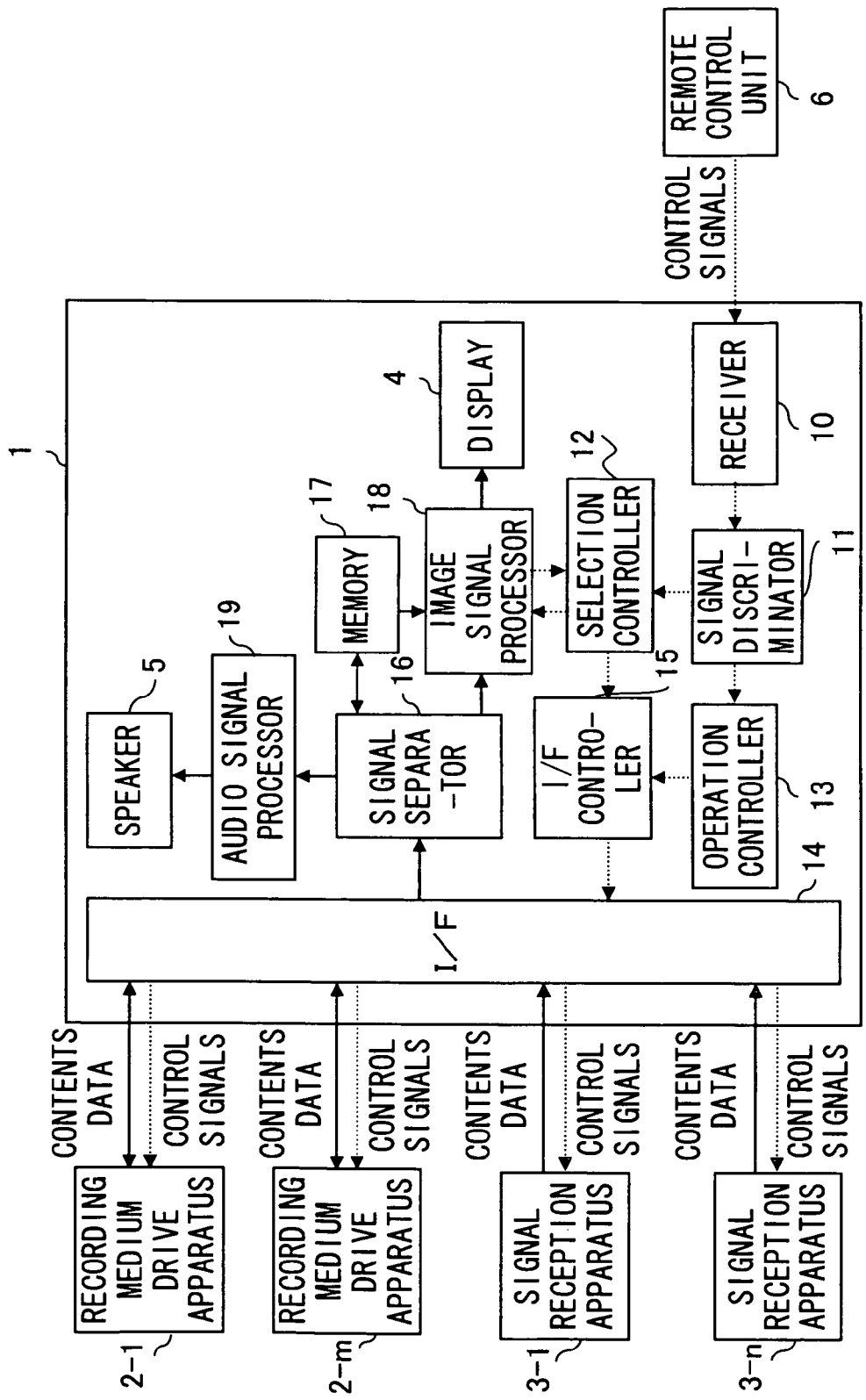
FIG. 21 is a block diagram showing another example of the internal configuration of an electronic appliance embodying the invention.
Figure 22:
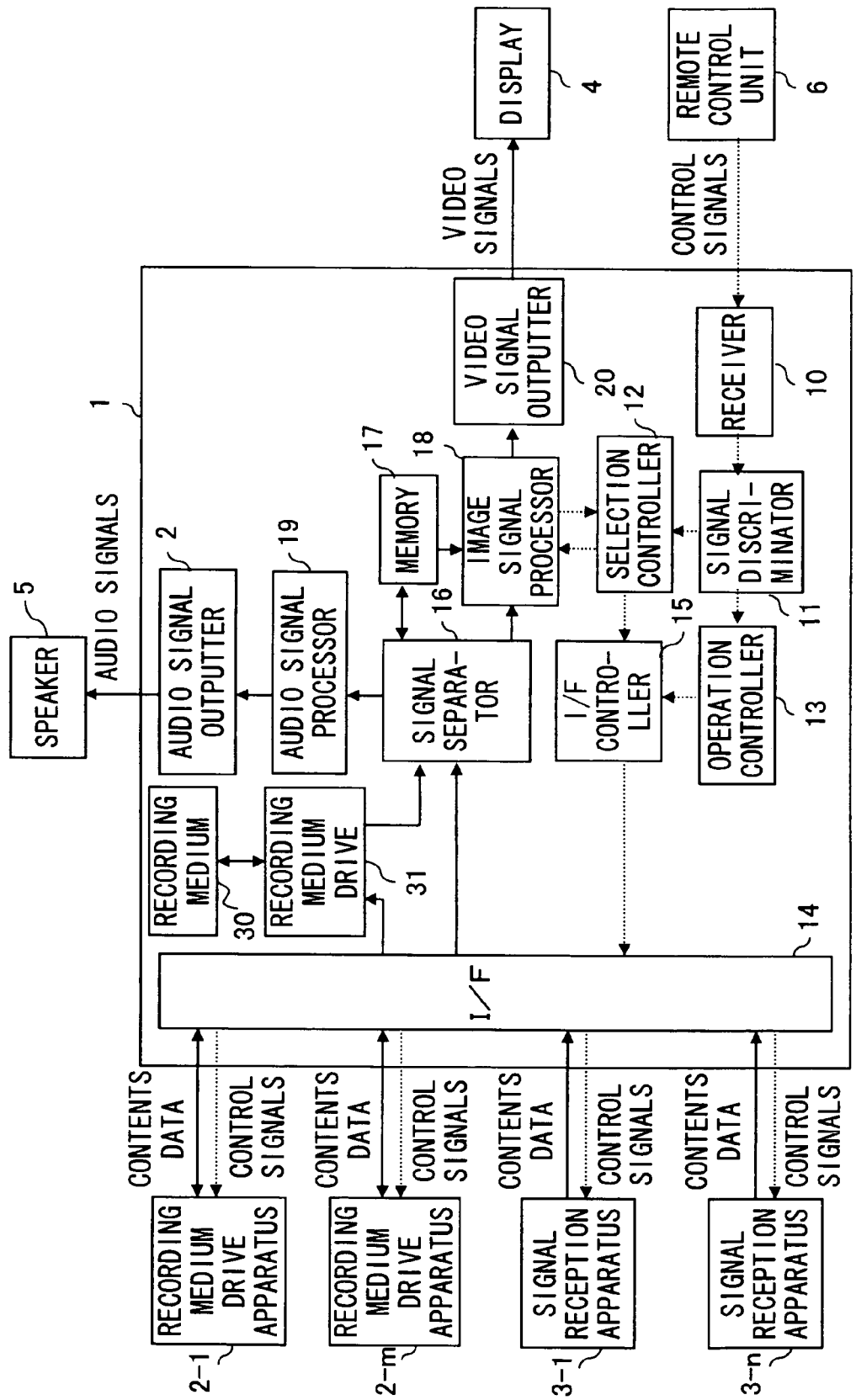
FIG. 22 is a block diagram showing another example of the internal configuration of an electronic appliance embodying the invention.
Figure 23:
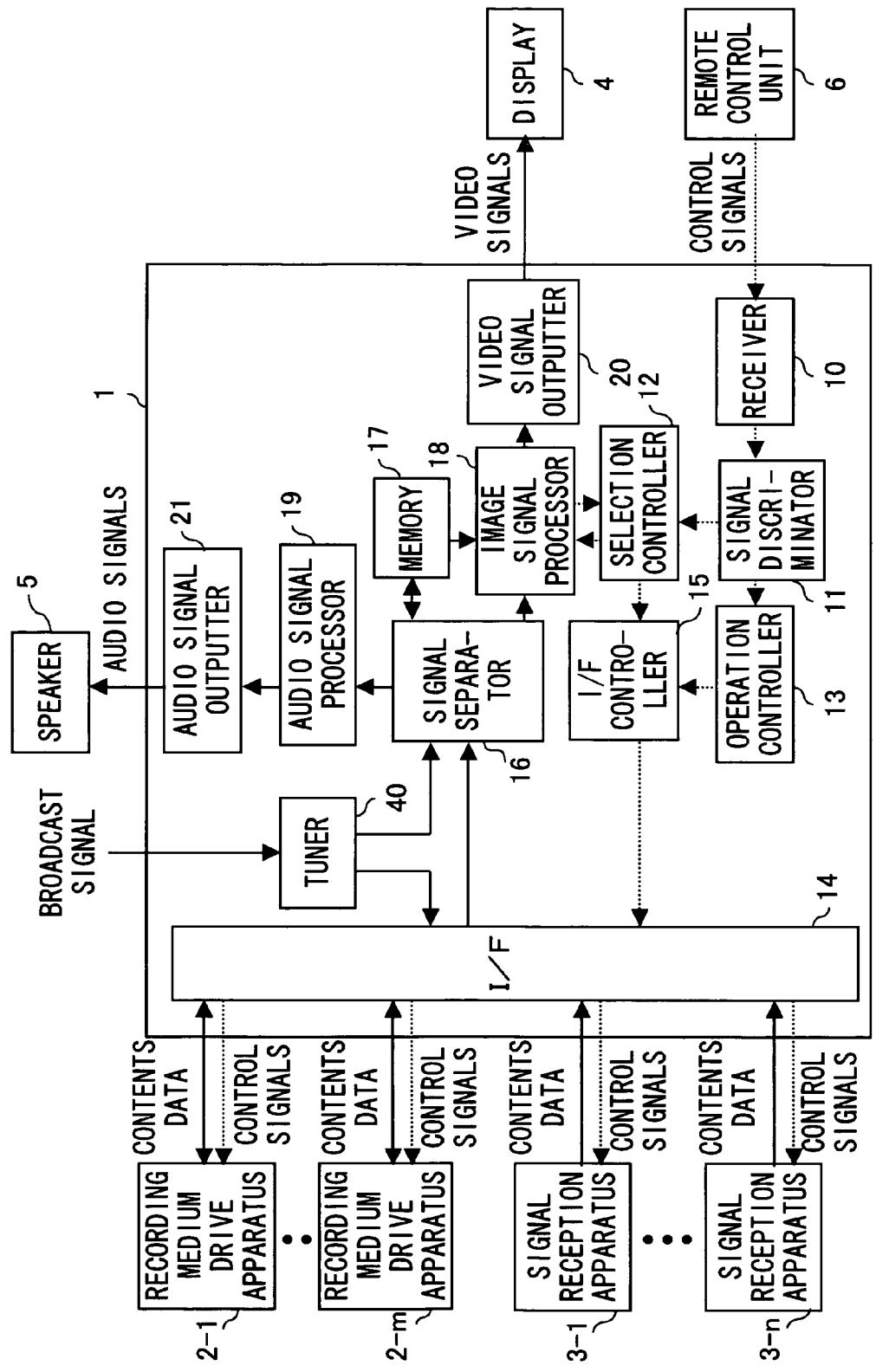
FIG. 23 is a block diagram showing another example of the internal configuration of an electronic appliance embodying the invention.

In the first and second embodiments, the electronic appliance 1 is built separately from the display 4 and the speakers 5. It is, however, also possible to incorporate a display 4 and speakers 5 as shown in FIG. 21, in which case the video signal outputter 20 and the audio signal outputter 21 are omitted. It is also possible, as shown in FIG. 22, to incorporate a recording medium drive 31 for driving a recording medium 30 so that the recording medium drive 31 feeds contents data to the signal separator 16 and the contents data received by the I/F 14 are fed to the recording medium drive 31. This permits the electronic appliance 1 to function also as a recording medium drive apparatus. It is also possible, as shown in FIG. 23, to incorporate a tuner 40 so that the contents data received by the tuner 40 is fed to the signal separator 16 and the I/F 14. This permits the electronic appliance 1 to function also as a signal reception apparatus.

Figure 24:
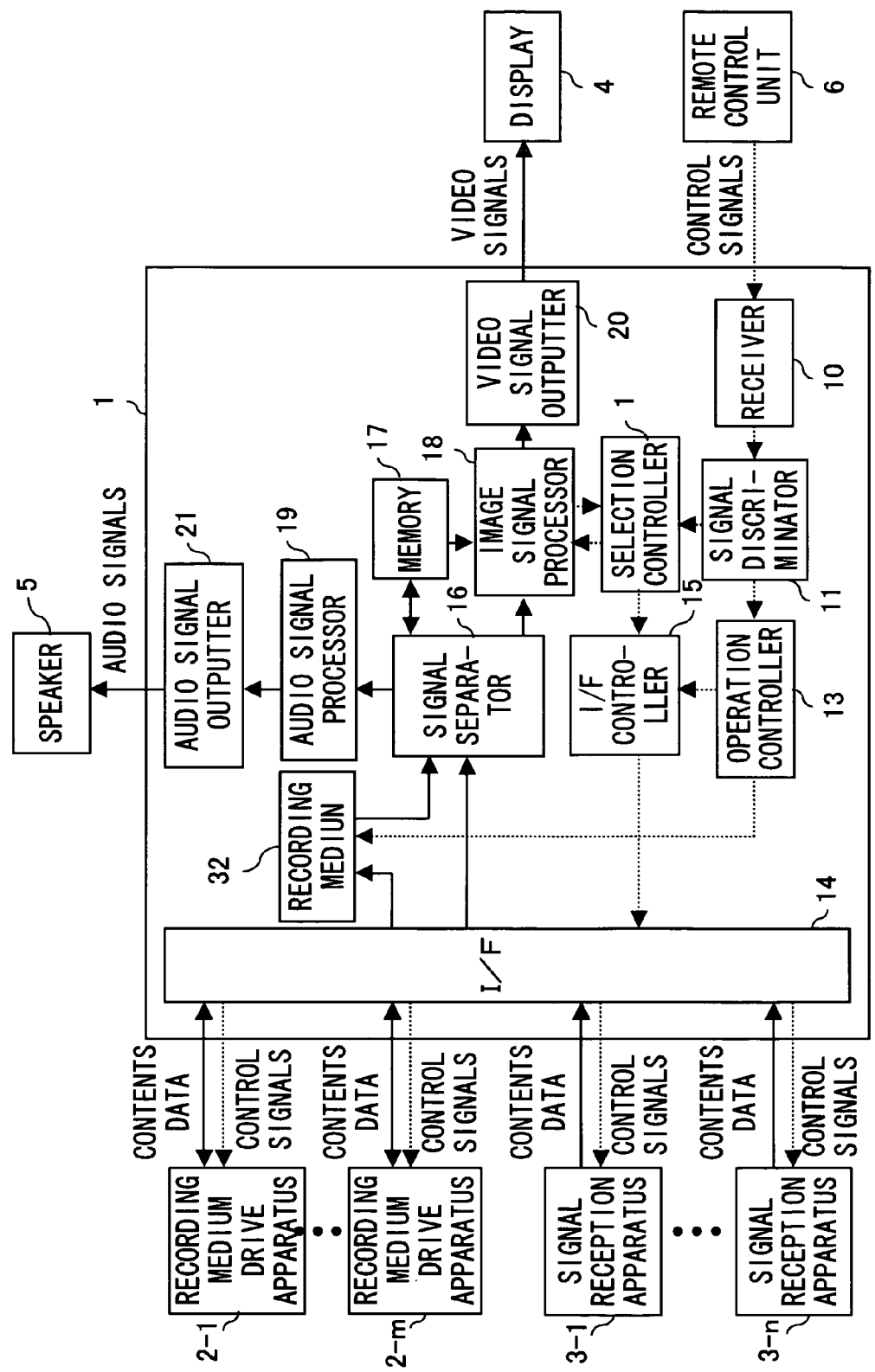
FIG. 24 is a block diagram showing another example of the internal configuration of an electronic appliance embodying the invention.

It is also possible, as shown in FIG. 24, to incorporate a recording medium 32 for temporarily storing the contents data received by the I/F 14 so that, in response to control signals transmitted to indicate various reproduction operations, the contents data recorded on the recording medium 32 are processed. Specifically, when the control code represented by the control signal contained in an infrared signal transmitted from the remote control unit 6 and received by the receiver 10 indicates a reproduction operation such as "play", "fast forward", or "rewind", the reproduction operation such as "play", "fast forward", or "rewind" is realized by switching the order and speed in and at which the contents data temporarily stored on the recording medium 32 is read out frame by frame.

An electronic appliance according to the present invention can be used as a communication apparatus that is connected to a reproduction/output apparatus for outputting sounds or images and that conducts communication with a tuner apparatus or a recording medium drive apparatus on a wireless or wired basis, or as a reproduction/output apparatus that conducts communication with a tuner apparatus or a recording medium drive apparatus on a wireless or wired basis, or as a tuner apparatus, or as a recording medium drive apparatus.

What is claimed is:

1. An electronic appliance comprising:
   a signal transmitter/receiver for
      receiving signals from a plurality of contents providing apparatuses and transmitting to the contents providing apparatuses control signals for controlling the contents providing apparatuses;
   a control signal receiver for receiving control signals from any one of remote control units belonging respectively to the contents providing apparatuses;
   a signal discriminator for judging that the one remote control unit that has transmitted the control signals received by the signal receiver, belongs to which contents providing apparatus; and
   a selection controller for recognizing, based on a result of judgment by the signal discriminator, what is indicated by the control signals transmitted from the remote control unit and received by the control signal receiver in order to select contents to be monitored and a contents providing apparatus from which to receive the contents.

2. The electronic appliance of claim 1, further comprising:
   an apparatus discrimination data table that accommodates correspondence between
      selection control signals for selecting contents to be monitored and a contents providing apparatus from which to receive the contents and
      control signals produced by the remote control units, wherein,
   the selection controller achieves the selection by referring to the apparatus discrimination data table, and then
   the signal transmitter/receiver receives the contents data of the contents to be monitored by requesting for the selected contents providing apparatus to transmit the contents data.

3. The electronic appliance of claim 2, further comprising:
   a code correspondence data table that accommodates correspondence among control signals of the remote control units; and
   an operation controller for producing control signals to be transmitted to the contents providing apparatuses based on control signals from the remote control unit, wherein,
   when the control signal receiver receives a first control signal from a remote controller, the operation controller decides and transmits a second control signal for a contents providing apparatus with which communication is currently being conducted by looking up the code corresponding data table.

4. The electronic appliance of claim 1, wherein
   first a first video signal is produced for displaying a list of all selectable contents providing apparatuses and selection of a contents providing apparatus is achieved by the list, and then
   a second video signal is produced for displaying a list of all contents that the selected contents providing apparatus can provide and selection of contents to be monitored is achieved by the latter list.

5. The electronic appliance of claim 4, further comprising:
   a contents data table in which all contents that the contents providing apparatuses can provide are classified on an apparatus-by-apparatus basis, wherein
   selection of contents to be monitored is achieved by referring to the contents data table.

6. The electronic appliance of claim 1, wherein first a video signal is produced for displaying a list of all selectable contents, selection of contents to be monitored is achieved, and then recognition of a contents providing apparatus that can provide the contents is achieved from the list.

7. The electronic appliance of claim 6, further comprising:
   a contents data table in which all contents that the contents providing apparatuses can provide are classified on an apparatus-by-apparatus basis, wherein
   selection of contents to be monitored is achieved by referring to the contents data table.

8. An electronic appliance comprising:
   a signal transmitter/receiver for
      receiving signals from a plurality of contents providing apparatuses and transmitting to the contents providing apparatuses control signals for controlling the contents providing apparatuses;
   a control signal receiver for receiving control signals from any one of remote control units belonging respectively to the contents providing apparatuses;

a signal discriminator for judging that the one remote control unit that has transmitted the control signals received by the signal receiver, belongs to which contents providing apparatus;
a code correspondence data table that accommodates correspondence among control signals produced by the remote control units; and
an operation controller for producing control signals to be transmitted to the contents providing apparatuses based on control signals from the remote control unit, wherein,
when the control signal receiver receives a first control signal from a remote controller, the operation controller decides and transmits a second control signal for a contents providing apparatus with which communication is currently being conducted by looking up the code corresponding data table.

9. An electronic appliance comprising:
a signal transmitter/receiver for
  receiving signals from a plurality of contents providing apparatuses and transmitting to the contents providing apparatuses control signals for controlling the contents providing apparatuses; and
a signal discriminator for judging that a remote control unit that has transmitted the control signals received by the signal receiver, belongs to which contents providing apparatus, wherein
first a video signal is produced for displaying a list of all selectable contents,
selection of contents to be monitored is achieved, and then
recognition of a contents providing apparatus that can provide the contents is achieved from the list.

10. The electronic appliance of claim 9, further comprising:
a contents data table in which all contents that the contents providing apparatuses can provide are classified on an apparatus-by-apparatus basis, wherein
selection of contents to be monitored is achieved by referring to the contents data table.

* * * * *